(12) United States Patent
Kumar et al.

(10) Patent No.: US 10,841,389 B2
(45) Date of Patent: Nov. 17, 2020

(54) INCREASING RELIABILITY OF PUSH NOTIFICATION-BASED AUTHENTICATION OR AUTHORIZATION

(71) Applicant: Oracle International Corporation, Redwood Shores, CA (US)

(72) Inventors: Samanvitha Kumar, Bangalore (IN); Nagaraj Pattar, Gulbarga (IN); Pruthvithej Ramesh Kumar, Bangalore (IN); Parthipan Kandasamy, Tiruppur (IN); Ashok Kumar Subbaiyan, Tiruppur (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 212 days.

(21) Appl. No.: 16/051,124

(22) Filed: Jul. 31, 2018

(65) Prior Publication Data
US 2019/0253509 A1 Aug. 15, 2019

(30) Foreign Application Priority Data
Feb. 13, 2018 (IN) .............................. 201841005321

(51) Int. Cl.
*H04L 29/08* (2006.01)
*G06F 9/54* (2006.01)
*H04L 29/06* (2006.01)

(52) U.S. Cl.
CPC ................ *H04L 67/26* (2013.01); *G06F 9/54* (2013.01); *H04L 63/08* (2013.01); *H04L 63/10* (2013.01)

(58) Field of Classification Search
CPC ......... H04L 67/26; H04L 63/10; H04L 63/08; H04L 2463/082; H04L 63/18; G06F 9/54; G06F 21/42; G06F 21/34
See application file for complete search history.

(56) References Cited

U.S. PATENT DOCUMENTS

| 9,338,156 B2 | 5/2016 | Oberheide et al. |
| 9,531,697 B2 | 12/2016 | Sondhi et al. |

(Continued)

OTHER PUBLICATIONS

A Real Time Messaging IP Channel for Push Notifications, Fast push notifications for Real time in-app IP messaging, Copyright 2016 [retrieved Dec. 1, 2017], Retrieved from the Internet: <URL: http://www.catapush.com/features/push-in-app-messaging>, 2 pages.

(Continued)

*Primary Examiner* — Meng Li
(74) *Attorney, Agent, or Firm* — Kilpatrick Townsend & Stockton LLP

(57) ABSTRACT

Techniques related to authentication and authorization are disclosed. In some embodiments, an access management system is provided for increasing the reliability of notification-based authentication and/or authorization. Push notifications, for example, may be used as part of multifactor authentication processing or authorization processing. In certain embodiments, in response to an event triggering an authentication or authorization flow for a user, multiple different ways are provided for delivering notifications related to the authentication or authorization flow to the user's device (e.g., a client device registered for push notification-based authentication or authorization). By providing multiple ways for communicating notifications related to the authentication or authorization to the user's device, the chance that an authentication-related or authorization-related notification is missed or not delivered to the user's device is dramatically reduced. This, in turn, increases the reliability of using notifications for authenticating or authorizing the user.

18 Claims, 11 Drawing Sheets

(56) References Cited

U.S. PATENT DOCUMENTS

| | | | |
|---|---|---|---|
| 9,692,758 | B2 | 6/2017 | Zeljkovic et al. |
| 2010/0011426 | A1* | 1/2010 | Falk ..................... H04W 12/06 726/7 |
| 2012/0272023 | A1* | 10/2012 | Hirade ................. G06F 3/0605 711/162 |
| 2013/0198061 | A1* | 8/2013 | Dheer .................. G06Q 20/223 705/39 |
| 2015/0025874 | A1* | 1/2015 | Matute ................ H04L 63/0853 704/4 |
| 2015/0312248 | A1* | 10/2015 | Pruthi ............... H04W 12/0608 726/7 |
| 2016/0337344 | A1 | 11/2016 | Johansson et al. |
| 2017/0063829 | A1 | 3/2017 | Raounak |
| 2017/0126660 | A1 | 5/2017 | Brannon |
| 2017/0279795 | A1* | 9/2017 | Redberg .............. H04L 63/0861 |

OTHER PUBLICATIONS

Catapush Architecture, Superior Mobile Notifications: Catapush XMPP architecture, Copyright 2016 [retrieved Dec. 1, 2017], Retrieved from the Internet: <URL: http://www.catapush.com/docs-quickstart>, 4 pages.

Mobile Login Requests (Push Notifications) Registration Method for Multi-Factor Authentication-SecureAuth IdP 9.0 X Documentation, Copyright 2017 [retrieved Nov. 28, 2017], Retrieved from the Internet: <URL: https://docs.secureauth.com/display/90docs/Mobile+Login+Requests+%28Push+Notifications%29+Registration+Method+for+Multi-Factor+Authentication>, 11 pages.

Mobile Push Message Queuing, Retry and Expiry Mechanism, Copyright 2016 [retrieved Dec. 1, 2017], Retrieved from the Internet: <URL: http://www.catapush.com/features/dispatch-reliability>, 2 pages.

Push Notifications, Experience Manager 6.3 Mobile, Copyright 2017 [retrieved Nov. 27, 2017], Retrieved from the Internet: <URL: https://helpx.adobe.com/experience-manager/6-3/mobile/using/phonegap-push-notifications.html>, 2017, 18 pages.

Lopez, Announcing Push Verifications for Symantec VIP, Symantec Official Blog, Feb. 24, 2014, Retrieved. from the Internet: <URL: https://www.symantec.com/connect/blogs/announcing-push-verifications-symantec-vip>, 5 pages.

Convenient & Secure Access for the modern Workforce, RSA SecurID® Access, Copyright 2017, Retrieved from the Internet: <URL: https://www.rsa.com/content/dam/pdfs/4-2017/rsa-securid-access-solution-overview.pdf>, 5 pages.

Swift Messaging Services—Secure, reliable and cost-effective messaging, Copyright 2011, Retrieved from the Internet: <URL: https://www.swift.com/node/13491>, 8 pages.

Symantec Validation & Identity Protection Service (VIP) Getting Started with VIP Access Push, Copyright 2014, Retrieved from the Internet: <URL: https://symwisedownload.symantec.com/resources/sites/SYMWISE/content/live/SOLUTION/24000/S024955/en_US/VIP%20Access%20Push.pdf?_gda_=1512007803_cfc4700ee4a21fca17e3e47cb7358f08>, 2 pages.

Oracle® Cloud, Administering Oracle Identity Cloud Service, Release 18.2.4, May 2018, Retrieved from the Internet: <URL: https://docs.oracle.com/en/cloud/paas/identity-cloud/uaids/administering-oracle-identity-cloud-service.pdf>, 361 pages.

* cited by examiner

INCREASING RELIABILITY OF PUSH NOTIFICATION-BASED AUTHENTICATION OR AUTHORIZATION

CROSS-REFERENCE TO RELATED APPLICATIONS

This application claims priority under 35 U.S.C. 119(a) to Indian Provisional Application No. 201841005321 titled "Techniques for Notification-Based Multi Factor Authentication for an Access Management System," filed on Feb. 13, 2018, the entirety of which is incorporated herein by reference.

BACKGROUND

For various reasons, push notifications have become a popular communication medium. Among other things, they enable near-instantaneous communication, and they can be configured to return pre-written responses. As a result, push notifications are being used increasingly for authenticating and/or authorizing users. For example, in the context of multi-factor authentication (MFA), a push notification having user-selectable options for "Allow" and "Deny" may be used to inform a user about an event triggering the authentication (e.g., a login attempt or attempt to access a resource) and to facilitate a quick response from the user (e.g., selection of "Allow" or "Deny") that is free of typing errors while enabling MFA to be performed.

However, push notifications are not completely reliable. This is partly because communication of push notifications requires push notification services (PNSs) that are not available (or not reliably available) in some networks or areas. Example PNSs include Apple Push Notification Service (APNs), Google Cloud Messaging (GCM), and Windows Push Notification Service (WNS). Some PNS providers have limited access or are restricted from certain geographical regions. For example, GCM is blocked in China. Thus, push notifications intended for the registered device of a user traveling in China may not be deliverable to the device using GCM.

Additionally, some PNSs require a direct and persistent connection between a client device and a PNS server. Accordingly, if a client device has to go through a proxy server (which is common in corporate WiFi networks) to connect to a PNS server, the client device may not be able to connect to a PNS server and may thus be unable to receive push notifications.

Some of the unreliability may also stem from PNS servers inadvertently discarding undelivered push notifications. In general, PNS servers only store one push notification per application per device. If a device is offline, typically, only the most recent push notification for an application on the device is stored, and any previous push notifications, which may be undelivered, that are targeted to the application on the device are discarded. Further, all the push notifications for the device may be discarded after some time, even if undelivered.

BRIEF SUMMARY

The present disclosure relates generally to authentication and authorization techniques. More particularly, techniques are described that enable notification-based authentication and/or authorization to be performed more reliably. Various inventive embodiments are described herein, including methods, systems, non-transitory computer-readable storage media storing programs, code, or instructions executable by one or more processors, and the like.

An infrastructure is provided for increasing the reliability of notification-based authentication. Push notifications, for example, may be used as part of MFA processing. In certain embodiments, in response to an event triggering an authentication flow for a user, multiple different ways are provided for delivering notifications related to the authentication flow to the user's device (e.g., a client device registered for push notification-based authentication). By providing multiple ways for communicating notifications related to the authentication to the user's device, the chance that an authentication-related notification is missed or not delivered to the user's device is dramatically reduced. This, in turn, increases the reliability of using notifications for authenticating the user.

In certain embodiments, when an event triggers an authentication flow for a user based upon notifications, a first notification is communicated to the user's device using a communication channel that uses a PNS. Examples of PNSs include APNs, GCM, WNS, and other third-party services that generate, during PNS registration, a device token for determining which device is to receive a push notification. Additionally, an infrastructure is provided for communicating a second notification for the same authentication flow to the user's device using a communication channel that does not use a PNS. In this manner, multiple notifications are generated for the same event and are communicated to the user's device using different communication channels, where at least one communication channel does not involve a PNS. Accordingly, as part of authenticating a user, if a notification cannot be delivered to a user's device via the PNS communication channel (e.g., for any of the reasons discussed in the Background section), an alternate channel is provided for delivering a notification to the user's device for authenticating the user. The first and second notifications may be considered as redundant notifications since they are generated in response to the same event and for the same authentication flow and user response to any one of the two notifications is sufficient for proceeding with the authentication processing.

Authentication-related processing may be coordinated by an access management system. In certain embodiments, the access management system is configured to provide at least two different ways of delivering notifications related to an authentication flow to a user's device (which may be any data processing system) registered for push notification-based authentication for the user. One of the notifications is sent via a third-party PNS. Another notification may be sent via a communications backchannel established between the access management system and the user's device. Establishing the communications backchannel may involve authenticating the user's device as a trusted device for communication with the access management system. Authentication may be performed using any of a variety of techniques involving a one-time password (OTP), a hash-based message authentication code (HMAC)-based one-time password (HOTP), a time-based one-time password (TOTP), a public/private key pair, and/or the like.

The user's device may thus receive multiple notifications generated in response to an event that triggers an authentication flow. These multiple notifications may be received via different communication channels, one of which may use a PNS channel. However, if a notification cannot be delivered via the PNS communication channel (e.g., for any of the reasons discussed in the Background section), an alternate way is provided for delivering a redundant notification to the user device. The user may then provide his/her input response to one of the multiple notifications. The user's input response may then be used by the access management system for authenticating the user. If multiple or redundant notifications are received by the user's device due to successful delivery of the notifications via the PNS channel and the alternate channel, then one of the multiple redundant notifications is outputted to the user, and the user may then respond to that notification. Providing multiple ways of delivering redundant notifications increases the reliability of using notifications as an authentication technique.

In certain embodiments, an infrastructure is provided for increasing the reliability of notification-based authorization. Like with authentication, in response to an event triggering an authorization flow for a user, multiple different ways are provided for delivering notifications related to the authorization flow to the user's device (e.g., a client device registered for push notification-based authorization). By providing multiple ways for communicating notifications related to the authorization to the user's device, the chance that an authorization-related notification is missed or not delivered to the user's device is dramatically reduced. This, in turn, increases the reliability of using notifications for authorizing a user.

In certain embodiments, when an event triggers an authorization flow for a user based upon notifications, multiple notifications (e.g., a first notification and a second notification) are communicated to the user's device using different communication channels, where one of the communications channels used may involve a PNS and at least one alternate communication channel is used that does not involve a PNS. For example, the first notification may be communicated to a user's device via a PNS, while the second notification may be communicated to the user's device using a communication channel that does not use a PNS. In this manner, multiple notifications are generated for the same authorization flow and are communicated to the user's device using different communication channels, where at least one communication channel does not involve a third-party PNS. Accordingly, if a notification cannot be delivered to a user's device via the PNS communication channel (e.g., for any of the reasons discussed in the Background section), an alternate channel is provided for delivering a notification to the user's device for authorizing the user. The multiple notifications (e.g., the first and second notifications) may be considered as redundant notifications since they are generated in response to the same event and for the same authorization flow, and user response to any one of the two notifications is sufficient for proceeding with the authorization processing. In certain embodiments, the communication of the redundant notifications for authorization-based processing may be managed by an access management system.

In certain embodiments, an access management system receives, from a source, information indicating that a user account is requesting access to a resource. Responsive to receiving the information, the access management system generates a first notification for authenticating or authorizing the user account in response to the user account requesting access to the resource. The access management system communicates the first notification to a push notification network for delivery to a first data processing system that is configured for receiving push notifications for authenticating or authorizing the user account. The first data processing system may be the source. Alternatively, the source may be a second data processing system that is separate from the first data processing system.

In certain embodiments, the access management system receives a request from the first data processing system for one or more notifications for the user account. Responsive to the request from the first data processing system, the access management system communicates a second notification to the first data processing system using a communication channel that does not involve the push notification network. The second notification corresponds to the first notification for authenticating or authorizing the user account in response to the user account requesting access to the resource.

The second notification provides redundancy for the first notification. Thus, the access management system may generate the second notification based upon making a copy of the first notification. In some embodiments, the second notification and the first notification may share a common identifier. Accordingly, prior to communicating the second notification, the access management system may cause storage of first information for the first notification. The first information may include one or more identifiers associated with the first notification. This enables the access management system to generate, responsive to receiving the request from the first data processing system, the second notification using the one or more identifiers.

In certain embodiments, the communication channel is established between the access management system and an application on the first data processing system. The application can be in an unlaunched state when the first notification or the second notification is displayed at the first data processing system.

In certain embodiments, the access management system receives, from the first data processing system, a response to the first notification or the second notification. The response may include user input received at the first data processing system. Additionally or alternatively, the response may indicate whether the response was in response to the first notification or the second notification. Thus, after receiving the response, the access management system may update the first information stored for the first notification such that the first information indicates whether the response was in response to the first notification or the second notification.

Sometimes, the response is to the first notification. For example, the response may be to the first notification when the first data processing system receives the first notification before the second notification.

Sometimes, the response is to the second notification. For example, the response may be to the second notification when the first data processing system receives the second notification before the first notification or when the first data processing system does not receive the first notification.

In certain embodiments, based upon the response to the first notification or the second notification, the access management system authenticates or authorizes the user account. Furthermore, the access management system communicates, to the source, information indicative of a result of authenticating or authorizing the user account. At times, the information indicative of the result of authenticating or authorizing the user account may comprise information indicating that the authenticating or the authorizing was not successful. However, when the information indicative of the result of authenticating or authorizing the user account comprises information indicating that the authenticating or the authorizing was successful, the result may include an address of the resource.

DETAILED DESCRIPTION

Figure 1:
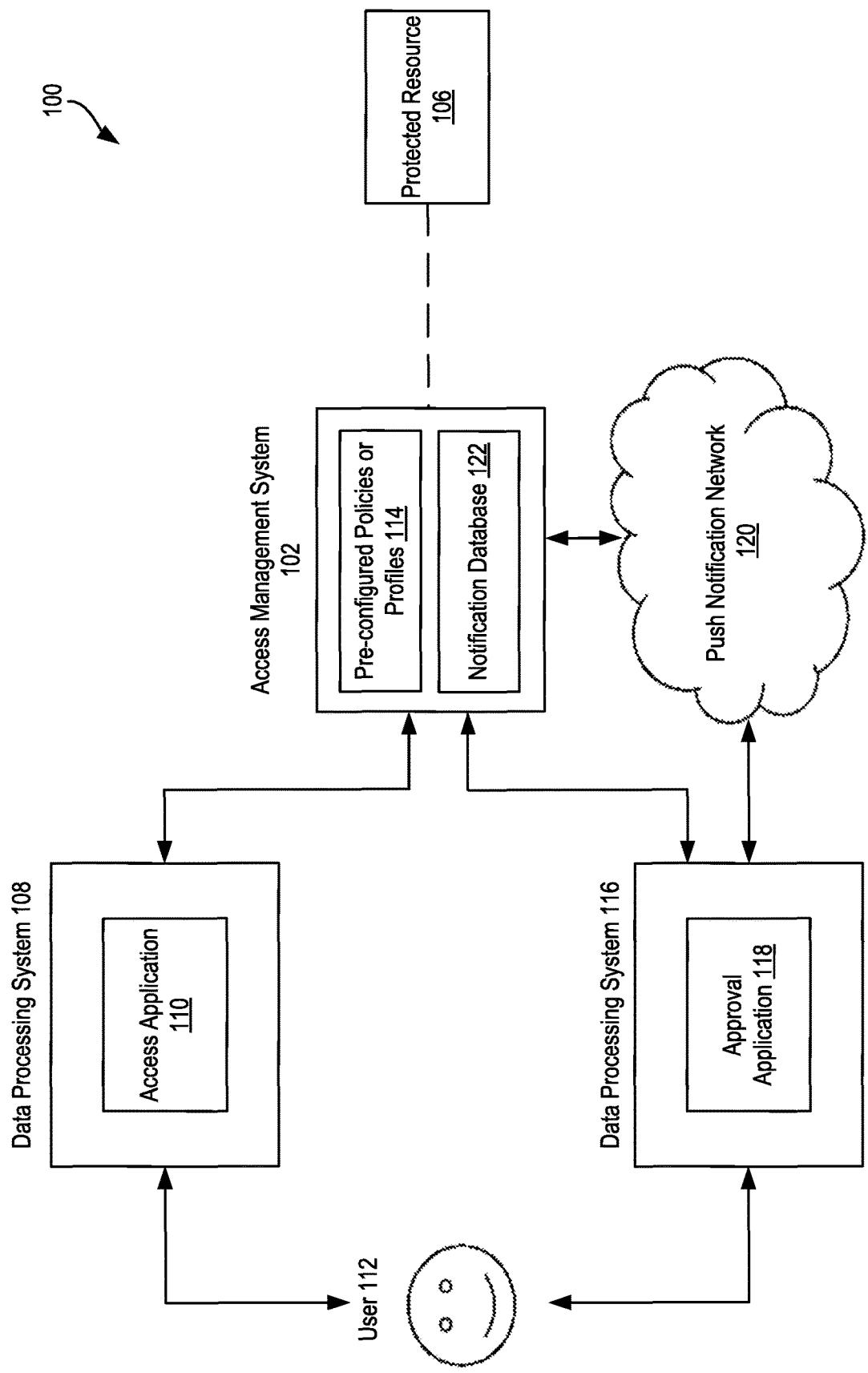
FIG. 1 is a simplified block diagram of a distributed environment incorporating an example embodiment.

In the following description, for the purposes of explanation, specific details are set forth in order to provide a thorough understanding of examples of the disclosure. However, it will be apparent that various examples may be practiced without these specific details. For example, circuits, systems, networks, processes, and other components may be shown as components in block diagram form in order to not obscure the examples in unnecessary detail. In other instances, well-known circuits, processes, algorithms, structures, and techniques may be shown without necessary detail in order to avoid obscuring the examples. The figures and description are not intended to be restrictive.

The present disclosure relates generally to authentication and authorization techniques. More particularly, techniques are described that enable notification-based authentication and/or authorization to be performed more reliably.

An infrastructure is provided for increasing the reliability of notification-based authentication. Push notifications, for example, may be used as part of MFA processing. In certain embodiments, in response to an event triggering an authentication flow for a user, multiple different ways are provided for delivering notifications related to the authentication flow to the user's device (e.g., a client device registered for push notification-based authentication). By providing multiple ways for communicating notifications related to the authentication to the user's device, the chance that an authentication-related notification is missed or not delivered to the user's device is dramatically reduced. This, in turn, increases the reliability of using notifications for authenticating the user.

In certain embodiments, when an event triggers an authentication flow for a user based upon notifications, a first notification is communicated to the user's device using a communication channel that uses a PNS. Examples of PNSs include APNs, GCM, WNS, and other third-party services that generate, during PNS registration, a device token for determining which device is to receive a push notification. Additionally, an infrastructure is provided for communicating a second notification for the same authentication flow to the user's device using a communication channel that does not use a PNS. In this manner, multiple notifications are generated for the same event and are communicated to the user's device using different communication channels, where at least one communication channel does not involve a PNS. Accordingly, as part of authenticating a user, if a notification cannot be delivered to a user's device via the PNS communication channel (e.g., for any of the reasons discussed in the Background section), an alternate channel is provided for delivering a notification to the user's device for authenticating the user. The first and second notifications may be considered as redundant notifications since they are generated in response to the same event and for the same authentication flow and user response to any one of the two notifications is sufficient for proceeding with the authentication processing.

Authentication-related processing may be coordinated by an access management system. In certain embodiments, the access management system is configured to provide at least two different ways of delivering notifications related to an authentication flow to a user's device (which may be any data processing system) registered for push notification-based authentication for the user. One of the notifications is sent via a third-party PNS. Another notification may be sent via a communications backchannel established between the access management system and the user's device. Establishing the communications backchannel may involve authenticating the user's device as a trusted device for communication with the access management system. Authentication may be performed using any of a variety of techniques involving OTP, HOTP, TOTP, a public/private key pair, and/or the like.

The user's device may thus receive multiple notifications generated in response to an event that triggers an authentication flow. These multiple notifications may be received via different communication channels, one of which may use a PNS channel. However, if a notification cannot be delivered via the PNS communication channel (e.g., for any of the reasons discussed in the Background section), an alternate way is provided for delivering a redundant notification to the user device. The user may then provide his/her input response to one of the multiple notifications. The user's input response may then be used by the access management system for authenticating the user. If multiple or redundant notifications are received by the user's device due to successful delivery of the notifications via the PNS channel and the alternate channel, then one of the multiple redundant notifications is outputted to the user, and the user may then respond to that notification. Providing multiple ways of delivering redundant notifications increases the reliability of using notifications as an authentication technique.

In certain embodiments, an infrastructure is provided for increasing the reliability of notification-based authorization. Like with authentication, in response to an event triggering an authorization flow for a user, multiple different ways are provided for delivering notifications related to the authorization flow to the user's device (e.g., a client device registered for push notification-based authorization). By providing multiple ways for communicating notifications related to the authorization to the user's device, the chance that an authorization-related notification is missed or not delivered to the user's device is dramatically reduced. This, in turn, increases the reliability of using notifications for authorizing a user.

In certain embodiments, when an event triggers an authorization flow for a user based upon notifications, multiple notifications (e.g., a first notification and a second notification) are communicated to the user's device using different communication channels, where one of the communications channels used may involve a PNS and at least one alternate communication channel is used that does not involve a PNS. For example, the first notification may be communicated to a user's device via a PNS, while the second notification may be communicated to the user's device using a communication channel that does not use a PNS. In this manner, multiple notifications are generated for the same authorization flow and are communicated to the user's device using different communication channels, where at least one communication channel does not involve a third-party PNS. Accordingly, if a notification cannot be delivered to a user's device via the PNS communication channel (e.g., for any of the reasons discussed in the Background section), an alternate channel is provided for delivering a notification to the user's device for authorizing the user. The multiple notifications (e.g., the first and second notifications) may be considered as redundant notifications since they are generated in response to the same event and for the same authorization flow, and user response to any one of the two notifications is sufficient for proceeding with the authorization processing. In certain embodiments, the communication of the redundant notifications for authorization-based processing may be managed by an access management system.

FIG. 1 is a simplified block diagram of a distributed environment 100 incorporating an example embodiment. Distributed environment 100 may comprise multiple systems communicatively coupled to each other via one or more communication networks (not shown). The systems in FIG. 1 include an access management system 102 communicatively coupled to data processing systems 108 and 116. Distributed environment 100 depicted in FIG. 1 is merely an example and is not intended to unduly limit the scope of claimed embodiments. One of ordinary skill in the art would recognize many possible variations, alternatives, and modifications. For example, in some implementations, distributed environment 100 may have more or fewer systems or components than those shown in FIG. 1, may combine two or more systems, or may have a different configuration or arrangement of systems. In particular, although the example of FIG. 1 illustrates two data processing systems 108 and 116 (one used by a user for accessing a resource and another for receiving a notification triggered by the access), it should be appreciated that in alternative embodiments, a single data processing system 108 or 116 may be used by the user for accessing a resource and for receiving a notification triggered by the access. Each of the various systems illustrated in FIG. 1 may be any computer system, such as the one illustrated in FIG. 6.

In certain embodiments, a user 112 may use the data processing system 108 to access a protected resource 106. For example, the user 112 may use an access application 110 executing on the data processing system 108 to access the protected resource 106. Access application 110 may be a client-side software, such as a browser. In certain embodiments, for a protected resource, access application 110 may be configured to communicate information regarding the user's access request to an access management system (AMS) 102 that protects protected resource 106 and is configured to perform authentication and/or authorization processing responsive to the user access request to determine whether or not the user is allowed to access the resource. For example, in the MFA context, access application 110 causes a first authentication factor (e.g., a username and password combination) to be communicated to AMS 102 as part of a request for access to protected resource 106.

Protected resource 106 may be any of a variety of resources. Examples of protected resource 106 include, without limitation, a software application, a webpage, a document, protected data, and the like. Protected resource 106 may be located locally or remotely from data processing system 108. Protected resource 106 may be located locally or remotely from AMS 102.

When user 112 accesses protected resource 106, the access is in the context of a user account associated with user 112. User 112 (e.g., a person) can have multiple user accounts. For example, user 112 may have a company user account (e.g., johndoe@companyXYZ.com), a social media user account (e.g., john.doe@fb.com), an email user account (e.g., john.doe@gmail.com), a gaming user account (e.g., johndoe@xboxlive.com), and the like. Thus, when user 112 requests access to protected resource 106, the access is requested and associated with a specific user account the user is using when the access is requested. Accordingly, the authentication or authorization processing performed by AMS 102 is performed for the specific user account requesting the access. Accordingly, for purposes of this disclosure, when a user is requesting access to a resource, it is to be understood that the access is being requested in the context of a particular user account for the user.

For example, as part of first factor authentication, user John Doe may provide information identifying his company's account (e.g., johndoe@companyXYZ.com) and provide a password associated with that user account. Second factor authentication (or authorization) is then also performed for his company account. As another example, if John Doe is trying to access a friend's vacation photos, John Doe may provide his personal email account (e.g., john.doe@gmail.com) and this user account is then authenticated and/or authorized to determine whether John Doe can access the photos.

AMS 102 may comprise one or more server computer systems for managing access to one or more protected resources including the protected resource 106. AMS 102 may be communicatively coupled to one or more client computer systems, such as the data processing systems 108 and 116. In some embodiments, AMS 102 is part of a cloud computing system, such as the one illustrated in FIG. 5. Server computer systems implementing AMS 102 may be implemented using one or more computer systems, such as the example computer system illustrated in FIG. 6.

In some embodiments, AMS 102 may control access to protected resource 106 according to permissions and restrictions associated with user accounts. These permissions and restrictions may be specified via pre-configured policies or profiles 114 that are stored by AMS 102 or are accessible to AMS 102. AMS 102 may use these policies and profiles 114 to control access to protected resources.

The pre-configured policies or profiles 114 may include settings and/or preferences for one or more user accounts including, for example, one or more user accounts associated with user 112. In particular, for a user account, pre-configured policies or profiles 114 may indicate authentication and/or authorization policies for the user account. The authentication and/or authorization policies for a user account may, for example, indicate whether multi-factor authentication is enabled for the user account as well as the different authentication factors to be used. For example, for a user account, the policies may indicate whether push notification-based authentication is one of the multi-factor authentication techniques.

There are various ways in which pre-configured policies or profiles 114 may be set or configured. In some embodiments, pre-configured policies or profiles 114 may be set by an administrator of AMS 102. In some other embodiments, pre-configured policies or profiles 114 may be set by user 112. In a multi-tenant cloud services environment, the pre-configured policies or profiles 114 may be tenant-specific and, for a tenant, may be set by an administrator of the tenant. For example, if a user's user account comes within the domain of a particular tenant, then policies set for that tenant may be applicable to that user's user account.

If push notification-based authentication or authorization has been enabled for a user account, then pre-configured policies or profiles 114 may also identify a user device for receiving the push notifications. Push notifications generated by AMS 102 for the user account are then communicated to this registered user device (or devices). For example, in the embodiment illustrated in FIG. 1, data processing system 116 may be pre-registered as the device for receiving push notifications for the user account associated with the user 112 and used in the context of requesting access to protected resource 106.

Although the example of FIG. 1 illustrates the same user 112 interacting with both data processing systems 108 and 116, it should be appreciated that the techniques disclosed herein are equally applicable to embodiments in which different users interact with data processing systems 108 and 116.

Registering a device for receiving push notifications typically involves communication among the registering device, a server (e.g., AMS 102) that is to communicate push notifications to the registering device, and a PNS (e.g., APNs, GCM, WNS). At a high level, push notifications operate based upon a device token (e.g., a unique identifier) for the registering device. Conceptually, the device token is used to determine where to send push notifications. During registration, the registering device communicates, to the PNS, a request for this device token. The request may comprise device information (e.g., a device identifier and/or an application identifier) that is collectively sufficient for uniquely identifying the device. Based upon the device information, the PNS generates the requested device token and communicates it to the registering device. However, the PNS maintains a mapping between the device information and the device token. In turn, the device communicates the device token to the server (e.g., AMS 102) that is to communicate push notifications to the device. Thereafter, the server (e.g., AMS 102) can include the device token in a push notification and send the push notification to the PNS for delivery to the device. Based upon the device token and the aforementioned mapping, the PNS may determine where to deliver the push notification.

A device is typically registered to receive push notifications related to an application installed on the device. In the embodiment illustrated in FIG. 1, an approval application 118 is installed on and executed by data processing system 116. Approval application 118 may be configured to process notifications as part of authentication and/or authorization workflows. For example, data processing system 116 may be a smartphone, and approval application 118 may be an app installed on the smartphone. In certain embodiments, installation of approval application 118 enables configuring the operating system (OS) to cause display of push notifications such that they are superimposed on the home screen (e.g., as a banner or alert), included in an interface (e.g., a Notification Center) for providing an overview of notifications on the lock screen, or otherwise communicated to the user 112 even when the approval application 118 is in an unlaunched state.

However, as mentioned above, a PNS is not always able to deliver push notifications to a registered device. For example, a device registered to receive push notifications via GCM may be unable to receive push notifications in China. As another example, a registered device may be unable to receive push notifications from behind a firewall. As yet another example, a PNS may discard push notifications intended for a registered device that has been offline.

In certain embodiments, in accordance with the teachings of this disclosure, a reliable notification-based authentication or authorization option ("reliable option") may be provided for user accounts. Enabling this option for a user account enables the user account to be provided with a more reliable way for performing notification-based authentication and/or authorization as described in this disclosure. The reliable option may be provided in addition to or in lieu of using a PNS to deliver push notifications.

For example, in the embodiment illustrated in FIG. 1, data processing system 108 may correspond to a laptop being used by user 112 associated with a particular user account to access protected resource 106. This access may trigger a push notification-based authentication and/or authorization processing workflow performed by AMS 102. Multiple notifications may be communicated by AMS 102 to data processing system 116, which may be a mobile device of user 112. One of the notifications may be outputted to user 112 via data processing system 116. User 112 may then, using data processing system 116, provide his/her input (e.g., allow or deny access to resource 106) based upon selecting one or more pre-written user responses in the outputted notification. The selected user response may then be communicated to AMS 102, which may then authenticate and/or authorize the user based upon pre-configured policies or profiles 114 configured for the user account and the user input.

Information identifying whether this reliable option is enabled for a user account may be stored in pre-configured policies or profiles 114 for the user account. Thus, in the preceding example, pre-configured policies or profiles 114 may store information identifying that the particular user account is configured for notification-based authentication and/or authorization involving notification delivery via both a PNS and the reliable option.

In order to facilitate the reliable option, AMS 102 may store or have access to a notification database 122 that stores information for notifications generated and communicated by AMS 102 using one or more PNSs for one or more user accounts. Further information related to notification database 122 is provided below with respect to FIGS. 2A-F. Further information related to processing performed for providing the reliable option and the interactions between the various systems illustrated in FIG. 1 are described below with respect to FIGS. 2-3 and the accompanying descriptions.

FIGS. 2A-F collectively constitute a flowchart 200 illustrating processing performed in the distributed environment 100, in accordance with certain embodiments. More specifically, the example of FIGS. 2A-F illustrate processing in a MFA context. However, it should be appreciated that substantially similar processing can be used for another workflow context, such as, for example, for an authorization workflow.

The processing illustrated in FIGS. 2A-F may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIGS. 2A-F and described below is intended to be illustrative and non-limiting. Although FIGS. 2A-F illustrate the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIGS. 2A-F may be performed using the data processing systems 108 and 116 as well as AMS 102. However, it should be appreciated that the processing illustrated in FIGS. 2A-F may be adapted for performance using a single data processing system 108 or 116.

Figure 2A:
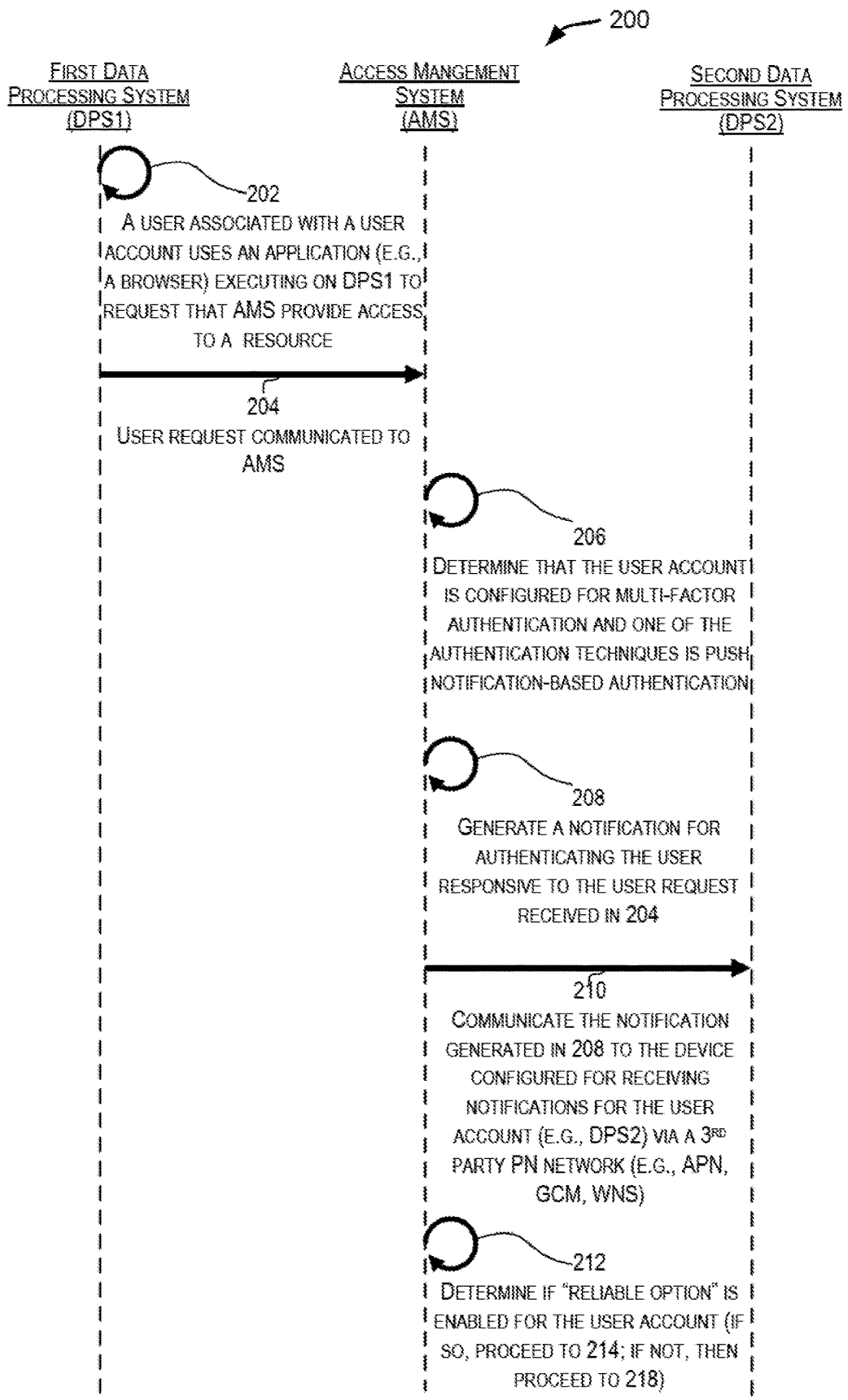
FIGS. 2A-F collectively constitute a flowchart illustrating processing performed in the distributed environment, in accordance with certain embodiments.

As shown in FIG. 2A at 202, a user (e.g., user 112) associated with a user account uses access application 110 (e.g., a browser) executing on DPS1 108 to request access to a protected resource 106. For example, the user may, in a browser, click upon a link to the resource. Clicking the link may cause an authentication flow to be executed. For example, the user may click on a link to a document (e.g., a web page, an internal document, etc.). As part of this authentication flow, the user may be prompted to provide a first authentication factor (e.g., a username and password combination, a personal identification number (PIN), or some other access credential) for the appropriate user account.

At 204, the DPS1 108 communicates a user request to AMS 102 that is configured to manage access for the resource 106 being accessed. The request received by the AMS 102 in 204 may identify the user account and the resource being accessed. The user request may include information that uniquely identifies the request, such as one or more unique identifiers including a request identifier for the user request. The user request may also include information related to the first authentication factor provided by the user at 202.

At 206, the AMS 102 may first perform processing to determine whether first factor-based authentication (e.g., based upon user account information and associated password information) is successful. Upon determining that first factor-based processing is successful, the AMS 102 may then determine whether the user account is configured for MFA and whether push notification-based authentication is one of the authentication techniques enabled for the user account for MFA. The processing in 206 in FIG. 2A assumes that the AMS 102 has determined that the user account is configured for MFA and for push notification-based authentication.

There are various ways in which a user account may be configured for MFA and the specific ways for performing MFA. This may be configured and set up via policies or profiles for the user account. For example, in a cloud services environment, the policies/profiles are generally tenant-specific (e.g., specific to a customer of a particular cloud service provided by a cloud services provider) and may be set by an administrator for the tenant. With respect to using push notification as an out-of-band authentication mechanism, for each user account, the policy/profile applicable to that user account may also store information identifying a computing device (e.g., DPS2 116) that is configured or registered to receive push notifications (PNs) for the user account. Accordingly, as part of 206, upon determining that push notification-based authentication is configured for the user account, AMS 102 may also determine the specific computing device that has been configured or set up to receive the push notifications for the user account.

In certain embodiments, for a device registered to receive push notifications for a user account, the AMS 102 may also store or have access to additional information related to the device. This additional information may include, for example, the operating system installed on the device, information identifying one or more applications installed on the device, security levels information for the device, whether any non-sanctioned applications (or blacklisted applications) are installed on the device, and the like. In some embodiments, this information may be collected by the AMS 102 (e.g., solicited from the user of the device or from the system administrator) when the device is registered for receiving push notifications.

At 208, responsive to the user request received at 204, the AMS 102 generates a notification (a first notification) for authenticating the user. The notification may be uniquely identified using one or more unique identifiers, such as the request identifier included in the user request, a device token identifying a device registered for receiving push notifications for the user account, etc. The notification may also include user-selectable options for allowing or disallowing access to the resource. For example, each of the user-selectable options may correspond to a pre-formulated response, such as "Allow", "Deny", or some other pre-written user input.

In some embodiments, the notifications may be generated in 208 according to one or more message templates. Different templates may be provided for different contexts. For example, in the context of a user account trying to access a resource, the notification may include content such as the following:

"User account <information identifying the user account> is attempting to access resource <information identifying the resource>. Allow or Deny access?" with separate user-selectable options provided for indicating the allow and deny options.

At 210, the AMS 102 communicates the notification generated in 208 to a third-party PNS (e.g., APNs, GCM, WNS) for delivery to the device (e.g., DPS2 116) configured to receive PNs for the user account. Accordingly, in 210, the notification generated in 208 is sent as a push notification to DPS2 116.

As mentioned above, the notification generated in 208 may include a device token identifying a device to which the notification is to be delivered. The third-party PNS uses this information to determine the device configured to receive the PNs. As mentioned above, when a device is registered with a PNS for receiving push notifications via the PNS, AMS 102 sends information (e.g., a device token) to the PNS identifying the device. In many ways, the device token serves as an address for the device.

At 212, the AMS 102 determines if a reliable notification-based authentication and/or authorization feature/option ("reliable option") is enabled for the user account. In certain embodiments, the AMS 102 may check the pre-configured polices/profiles of the user account to determine if the reliable option is enabled for the user account. If the AMS 102 determines in 212 that the reliable option is enabled for the user account associated with the request received in 204, then processing proceeds to 214 of FIG. 2B. Otherwise, normal push notification-based processing is performed and processing according to the teachings of this disclosure for reliable notification-based authentication is not performed. The ability to enable/disable the reliable option on a per-user-account basis provides flexibility in how notification-based authentication and/or authorization is to be performed for the user account.

Figure 2B:
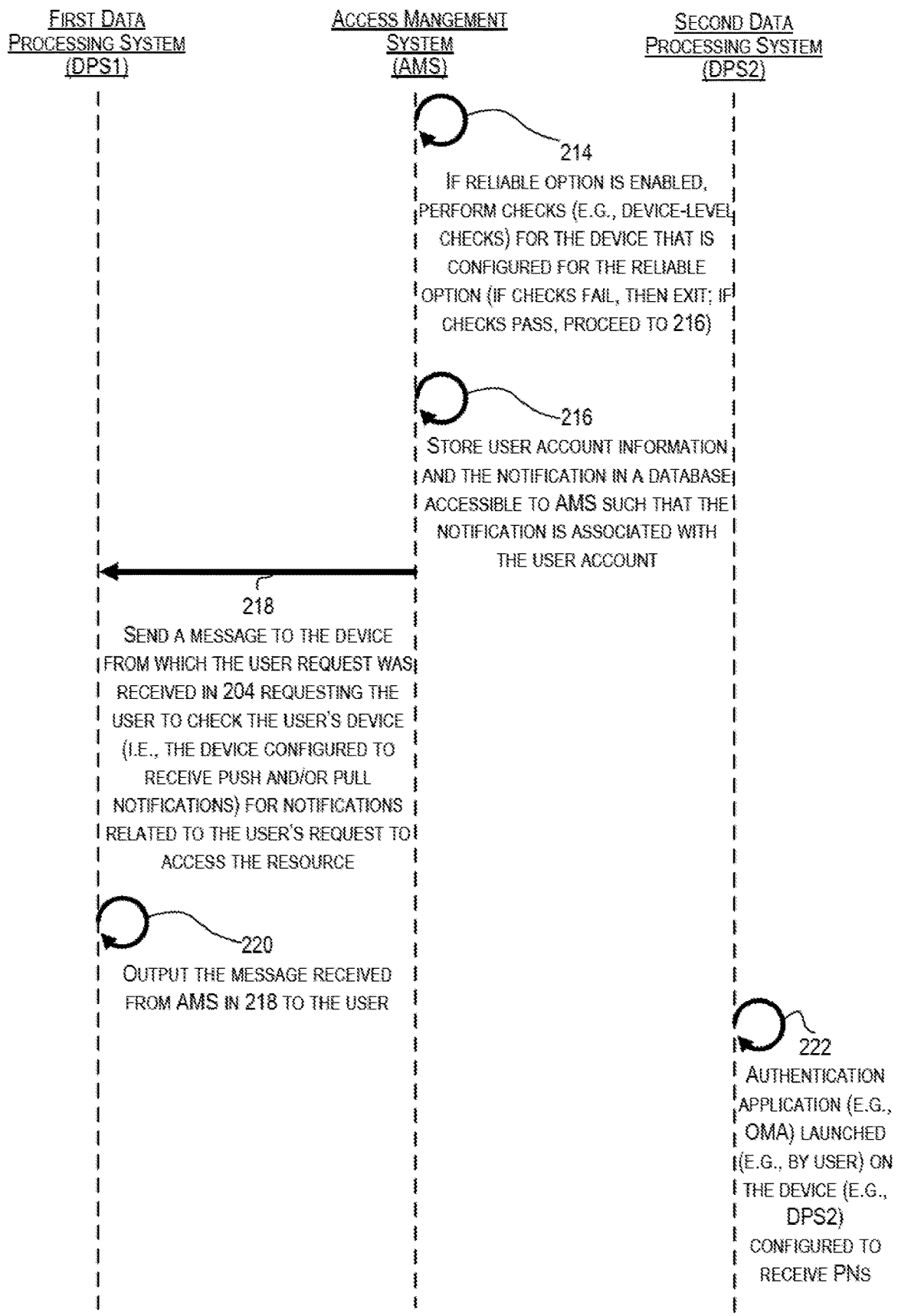

At 214 of FIG. 2B, the AMS 102 performs checks (e.g., device-level checks) to determine whether the device identified in 206 that is configured to receive push notifications meets or is compliant with the prerequisites or conditions for the reliable option. These prerequisites or conditions may be set by an administrator such as, for example, a tenant administrator.

In certain embodiments, information stored by or accessible to the AMS 102 for the device may be used by the AMS 102 for performing the checks in 214. For example, the reliable option may only be allowed for devices with certain operating systems and/or certain versions of certain operating systems. As part of 214, the AMS 102 may check whether the device registered to receive push notifications has an operating system (or a version of an operation system) that is included in the allowable list of operating systems. As another example, the AMS 102 may check whether the device has any unsanctioned or blacklisted applications installed on the device, and if so, the device may not pass the checks performed in 214.

If the AMS 102 determines in 214 that the device configured to receive push notifications for the user account successfully passes the checks, then processing proceeds to 216. Otherwise, normal push notification-based processing is performed and processing according to the teachings of this disclosure for reliable notification-based authentication is not performed.

At 216, the AMS 102 stores, in a database or other storage location accessible to the AMS 102, information related to the notification generated at 208 and communicated in 210 and associates the stored information with user account information. For example, an entry may be created in notification database 122 for the notification generated in 208 and communicated in 210. The entry may include information related to the notification and the user account, thus associating the notification with the user account. For example, the created entry may store user account information, which may be a unique account identifier. The entry may also store information for the notification generated in 208 and communicated in 210. The information related to the notification may include, for example, information identifying the notification (e.g., a notification identifier), information identifying the device (e.g., a device token) to which the notification was sent, information identifying the specific PNS used for communicating the notification to DPS2 116, a copy of the notification, information identifying the user request (e.g., a request identifier) in response to which the notification was generated and communicated, information identifying a time when the notification was communicated, and the like.

In certain embodiments, each notification communicated to a device has a fixed validity duration. The duration may be calculated based upon the time when the notification was generated or communicated to the device. The notification is deemed to be expired after that validity duration has passed. Accordingly, as part of 216, the database entry for the notification may also store information identifying the expiry time for the notification.

Notification database 122 can store information (e.g., entries) for multiple notifications that have been communicated to one or more devices, for one or more user accounts. For example, it is possible that multiple notifications are communicated via one or more PNSs for the same user account. Information for these notifications may be stored in notification database 122 and may be associated with the user accounts.

At 218, the AMS 102 communicates a message to the device (e.g., DPS1 108) from which the user request was received at 204 indicating that at least one push notification has been communicated to the device registered to receive push notifications for the user account. The message may request the user of DPS1 108 to check DPS2 116 (the device to which the notification was sent in response to the user's request to access the resource).

At 220, the DPS1 108 may output the message received from the AMS 102 in 218 to the user. For example, in the MFA context, the message may include the statement "To finish signing in, check the notification sent to your other device."

In the embodiment illustrated in FIG. 2, DPS2 116 is the device that is configured to receive notifications related to the authentication workflow. In certain embodiments, an approval application 118 may be installed on DPS2 116 that is configured to receive and process notifications communicated to DPS2. In certain embodiments, the approval application 118 may be configured to receive notifications communicated to DPS2 116 for specific applications (e.g., only for Oracle applications). Examples of an approval application 118 include the Oracle Mobile Authenticator (OMA) application provided by Oracle Corporation of Redwood Shores, Calif.

At 222, the approval application 118 on a device (e.g., DPS2 116) configured to receive push notifications may be opened or launched. For example, upon seeing the message output in 220, the user of DPS1 108, as part of checking the notifications sent to DPS2 116, may launch the approval application 118 on DPS2 116.

The approval application 118 may be configured to process notifications associated with one or more user accounts. Notifications associated with different accounts may be distinguished, for example, based upon information identifying the user account (e.g., a user account identifier).

At 224, the approval application 118 determines whether the user account is configured/enrolled for the reliable option. If so, processing proceeds to 226. Otherwise, normal push notification-based processing is performed and processing according to the teachings of this disclosure for reliable notification-based authentication is not performed.

In some embodiments, configuring/enrolling the user account for the reliable option involves establishing that the approval application 118 and/or DPS2 116 is trusted for backchannel communications with the AMS 102. This can be performed at 224 or beforehand (e.g., prior to step 202). For example, trust may be established based upon TOTP authentication. The approval application 118 and/or DPS2 116 may communicate, to the AMS 102, device information, such as OS, platform, version, device attributes, etc. The AMS 102 may use the device information to create a record of the TOTP authentication. Furthermore, the AMS 102 may communicate, to the DPS2 116, a shared secret for generating the TOTP. The AMS 102 may also communicate, to the DPS2 116, other information, such as TOTP length and time step. The approval application 118 may then generate a TOTP and communicate it to the AMS 102 for verification. Significantly, TOTP authentication may be performed quickly and seamlessly without any manual intervention.

Upon successful TOTP authentication, the approval application 118/DPS2 116 may be trusted for communication with the AMS 102. For example, the AMS 102 may host a Representational State Transfer (REST) application programming interface (API) through which the approval application 118/DPS2 116 may communicate with the AMS 102. Thus, it is unnecessary to maintain a persistent connection between the AMS 102 and the approval application 118/DPS2 116, because the approval application 118/DPS2 116 can invoke the REST API on an as-needed basis.

At 226, the approval application 118 performs checks to verify that the user account and the DPS2 116 meet or are compliant with the prerequisites or conditions for the reliable option. These prerequisites or conditions may be set by an administrator such as, for example, a tenant administrator. When configuring/enrolling the approval application 118 and/or DPS2 116 for the reliable option, the AMS 102 may provide the approval application 118 with the prerequisites or conditions. The prerequisites or conditions may specify checks to be performed at every launch of the approval application 118. Example checks include, without limitation, an absence of a jail-broken device, a minimum OS level, a latest version of the approval application 118, and/or authentication based upon a PIN or fingerprint identification. If all the checks pass, processing proceeds to 228. Otherwise, further processing at the DPS2 116 may cease with an error message being sent to the AMS 102.

At 228, the DPS2 116 communicates a request to the AMS 102 requesting all active and not-responded-to notifications for the user account and for which DPS2 116 is the registered device for receiving the notifications. The request communicated in 228 from DPS2 116 to the AMS 102 may include information identifying the user account (e.g., an account identifier), information identifying DPS2 116 (e.g., a device token for DPS2 116), etc.

In certain embodiments, DPS2 116 and the approval application 118 on DPS2 116 may be configured to receive notifications for multiple user accounts. In such a scenario, the request communicated in 228 may request information for the multiple user accounts where the DPS2 116 is the registered device for receiving the notifications. In some embodiments, the multiple user accounts may be identified in a single request communicated from the DPS2 116 to the AMS 102 in 228. In some other embodiments, instead of a single request identifying multiple user accounts, multiple requests may be communicated from DPS2 116 to the AMS 102, each request identifying a single user account from the multiple user accounts. After 228 of FIG. 2C, processing proceeds to 230 of FIG. 2D.

At 230, the AMS 102 performs checks to determine if the user account identified in the request received in 228 is registered for the reliable option. This check may include determining if the requesting approval application 118 and DPS2 116 are enrolled and enabled for the reliable option for the user account. Additionally, as part of 230, the AMS 102 may determine whether the approval application 118 and DPS2 116 are compliant with or meet the prerequisites or conditions for the reliable option. In certain embodiments, these checks are analogous to and/or additional to those performed at 224 and 226. If the checks pass, processing proceeds to 232. Otherwise, normal push notification-based processing is performed and processing according to the teachings of this disclosure for reliable notification-based authentication is not performed.

At 232, the AMS 102 accesses the database (e.g., notification database 122) to identify all active and not-responded-to notifications for the user account identified in the request received in 228 and for which DPS2 116 is the registered device for receiving the notifications. The notifications in 232 are identified based upon the entries stored in the notification database 122 in 216 for the notifications communicated in 210. In certain embodiments, these database entries are traversed to identify entries corresponding to notifications that have been communicated to DPS2 116 for the user account and which have not expired and have not been responded to.

As previously described, in some embodiments, a notification generated in 208 and communicated to the DPS2 116 in 210 via a PNS is associated with an expiry time. The expiry time is stored in the notification database entry created for and storing information for that notification. An active notification is a notification that has not expired. This can be determined based on expiration time information stored in the notification database entries for the notifications generated in 208 and communicated in 210. Accordingly, as part of the processing performed in 232, AMS 102 accesses the notification database 122 and identifies entries for those notifications sent for the user account that are not expired.

The time for when a notification expires may be user-configurable. For example, a pre-configured policy may specify that all notifications older than 24 hours should be treated as expired notifications, etc. These expired notifications are not selected by the AMS 102 in 232. Treatment of expired notifications is described in greater detail below with reference to step 254 of FIG. 2F.

Additionally, as part of the processing in 232, the AMS 102 only identifies and selects notifications that have not already been responded to. In some embodiments, for a notification associated with a user account and for which information is stored in the notification database 122, when the AMS 102 receives, from the DPS2 116, a user input response to the notification, the AMS 102 updates the notification database entry for that notification to indicate that the notification has already been responded to. If a notification has already been responded to, then there is no need to further process that notification. As a result, if the AMS 102 determines in 232, based upon the information stored in the notification database entry for that notification, that the notification has already been responded to, then that notification is not selected in 232.

At 234, for each active and not-responded-to notification identified and selected in 232, the AMS 102 generates a notification (second notification) corresponding to the active and not-responded-to notification (first notification) and communicates the second notification to the requesting DPS2 116 using a communication channel (also referred to as an alternate channel or backchannel) that does not involve any third-party PNS.

Various different ways may be used to indicate the correspondence between each active and not-responded-to notification identified in 232 and the notification generated and communicated in 234. In some embodiments, the notification generated and communicated in 234 is a copy of the notification identified in 232 (i.e., a copy of the notification generated in 208 and communicated in 210). In some embodiments, the notification generated and communicated in 234 and the notification identified in 232 (i.e., the notification generated in 208 and communicated in 210) have the same notification identifier. In some embodiments, the notification generated and communicated in 234 and the notification identified in 232 (i.e., the notification generated in 208 and communicated in 210) identify the same user account and user request identifier corresponding to the user request received in 204 by the AMS 102 that triggered the authentication workflow. In other embodiments, other identifiers (or combinations of these and the previously described identifiers) may be used to identify the correspondence between an active and not-responded-to notification identified in 232 and the notification generated and communicated in 234.

In certain embodiments, the alternate or backchannel to be used for the communication may be configured for the user account (and potentially for a user account for DPS2 116). This backchannel may become available, for example, when the user account and/or device is registered for the reliable option. At registration time, information may be provided to the AMS 102 regarding DPS2 116, its operating system, platform, version, device attributes, etc. Information may also be provided regarding an alternate channel to be used for the reliable option. The AMS 102 may use the device information to create a record of the configuration/enrollment.

As part of the processing in 234, the AMS 102 may first establish that the approval application 118 and/or DPS2 116 is trusted for direct communication via an alternate channel and then communicate the notification(s) generated in 234 via this channel. In certain embodiments, establishing trust may involve a one-time TOTP authentication. The AMS 102 may communicate, to the DPS2 116, a shared secret for generating a TOTP. The AMS 102 may also communicate, to the DPS2 116, other information, such as TOTP length and time step. The approval application 118 on DPS2 116 may then generate a TOTP and communicate it to the AMS 102 for verification. Upon successful verification, the approval application 118 may communicate directly with the AMS 102 via a backchannel.

As previously described, multiple notifications may be identified in 232. Accordingly, multiple corresponding notifications may be generated and communicated from the AMS 102 to the DPS2 116 in 234. In some embodiments, the multiple corresponding notifications may be communicated in a single communication from the AMS 102 to the DPS2 116. In some other embodiments, the multiple corresponding notifications may be communicated over multiple communications from the AMS 102 to the DPS2 116 (e.g., one corresponding notification per communication). The multiple notifications may be communicated to the DPS2 116 concurrently or sequentially.

As described above, the corresponding notifications are communicated from the AMS 102 to the DPS2 116 in 234 in response to a request received by the AMS 102 from DPS2 116 in 228. These corresponding notifications may thus also be referred to as "pull" notifications, with each pull notification corresponding to a push notification communicated in 210.

In certain embodiments, the AMS 102 may update the database entry stored in the notification database 122 in 216 for the notification communicated via a PNS in 210 with information indicating that a pull notification corresponding to the push notification has been communicated to DPS2 116 via the backchannel. In this manner, for each notification communicated via a PNS, the notification database 122 also stored information indicating whether a notification corresponding to the push notification has also been communicated to DPS2 116 via a backchannel.

As previously indicated, the request received by the AMS 102 from the DPS2 116 in 228 may identify multiple user accounts. In some other embodiments, the AMS 102 may receive multiple requests from DPS2 116, each request identifying a user account. In such a scenario, the processing performed in 230 and 232 may be performed for each identified user account. The processing may be performed sequentially or concurrently.

For each requested user account, DPS2 116 may receive one or more pull notifications from the AMS 102 in 234. At 236, for each pull notification received from the AMS 102 in 234, the approval application 118 determines whether a push notification (i.e., a notification communicated in 210 via a PNS) corresponding to the pull notification has also been received by DPS2 116 and where the push notification has not yet been outputted to the user of DPS2 116. The approval application 118 may determine correspondence between a pull notification and a push notification based upon information contained in the notifications. For example, as described earlier with respect to 234, various ways may be used to indicate that a pull notification and a push notification correspond to each other. The approval application 118 may use this information to identify corresponding push and pull notifications in 236.

If it is determined in 236 by the approval application 118 on the DPS2 116 that, for a pull notification received from the AMS 102, there is also a corresponding push notification that has not been outputted to the user, then the approval application 118 selects one of the two notifications for outputting to the user via DPS2 116. In certain embodiments, the push notification receive via the PNS is selected. In some other embodiments, of the two corresponding notifications, the one that is receive first is selected. Accordingly, if it is determined in 234 that redundant or corresponding push and pull notifications are received by the DPS2 116, one of the notifications is selected for output to the user of DPS2 116.

If it is determined in 236 by the approval application 118 on the DPS2 116 that, for a pull notification received from the AMS 102, there is no corresponding push notification received by DPS2 116, then the pull notification is selected for output via DPS2 116. In this manner, even if the push notification is not received by DPS2 116 (e.g., for any of the reasons described in the Background section of this disclosure), the communication of the corresponding pull notification via the backchannel provides an alternate notification delivery mechanism for reliably delivering the notification to DPS2 116. The backchannel is more reliable than third-party PNSs, which may be subject to the problems of not being available in certain geographic areas or certain network architectures. The backchannel communication can be implemented in any network where the AMS 102 is available including, but not limited to, networks with proxy servers.

Figure 2C:
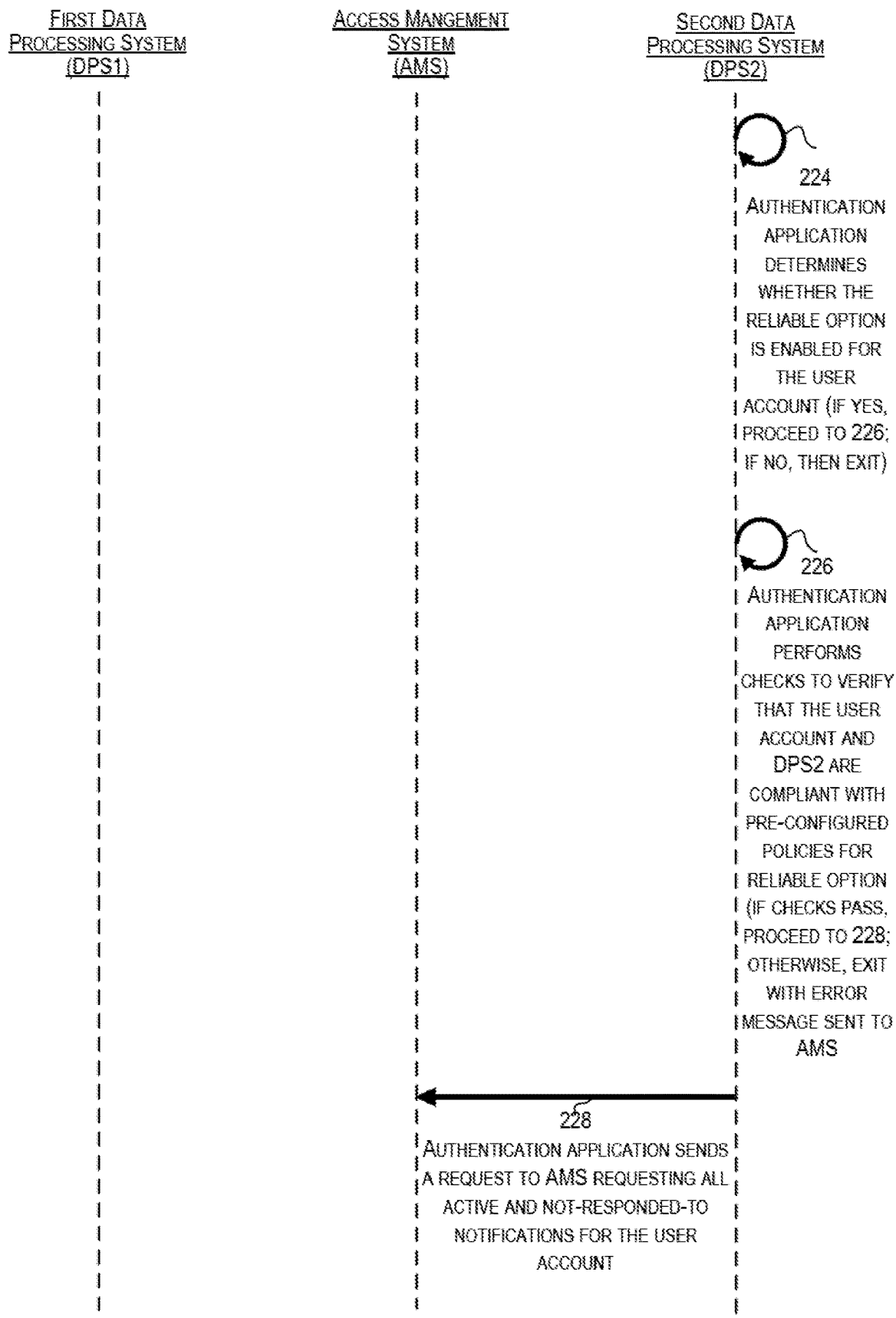
Figure 2D:
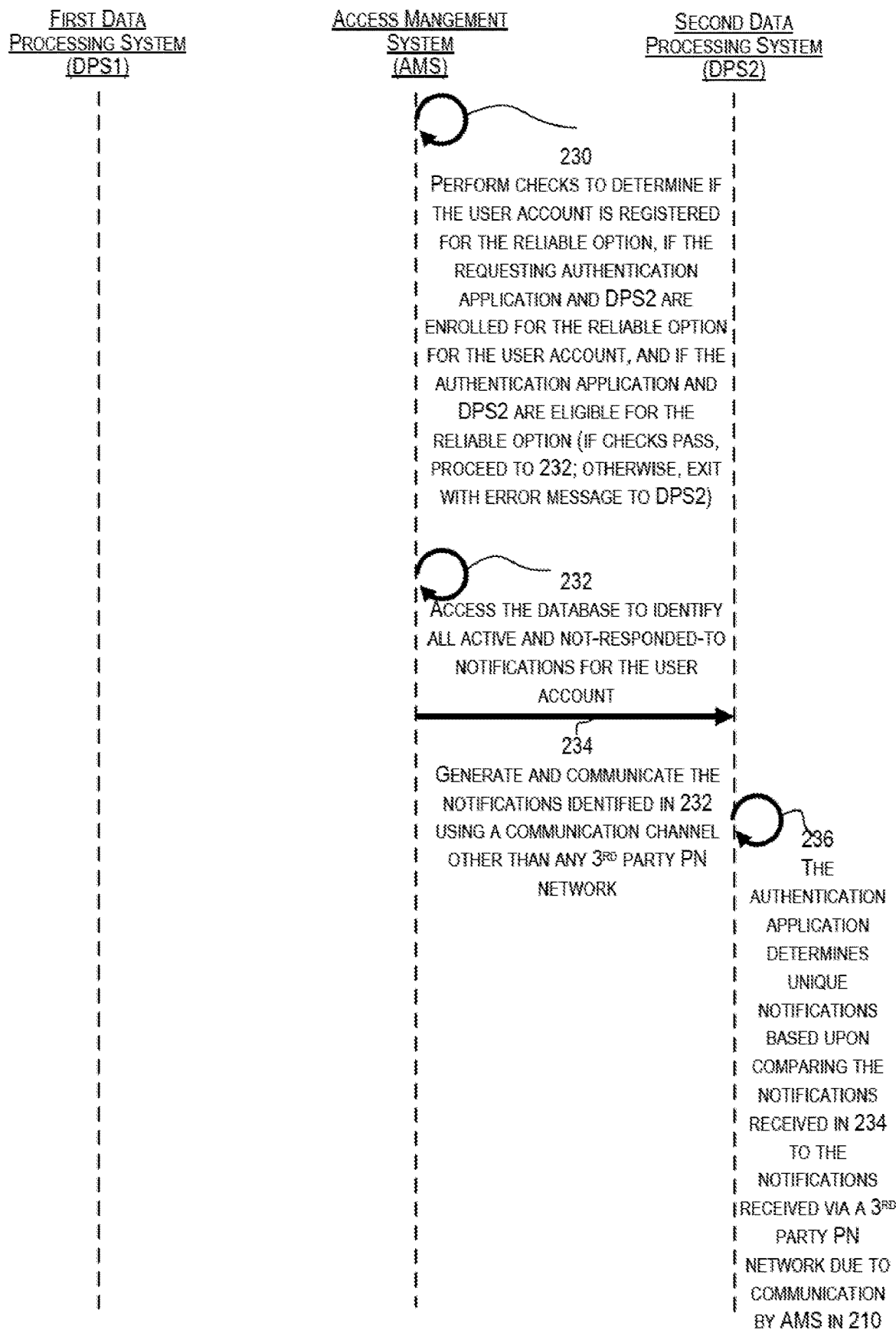
Figure 2E:
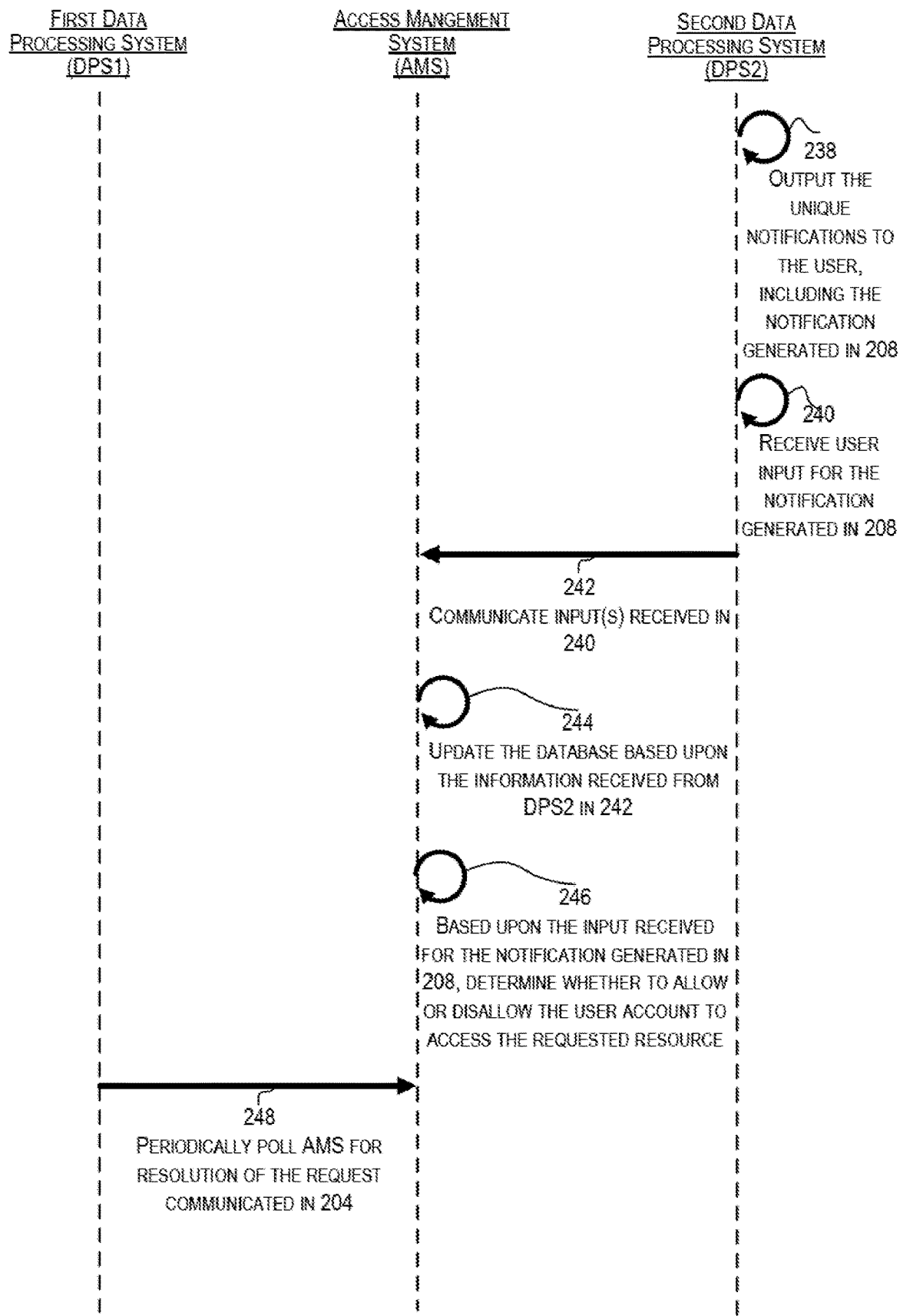

After 236 in FIG. 2D, processing proceeds to 238 in FIG. 2E. At 238, the notification selected in 236 is outputted to the user via an interface of DPS2 116. For example, the notification may be outputted via an output device (e.g., a screen or monitor) of DPS2 116. In some embodiments, the selected unique notifications may be outputted via the approval application 118 on DPS2 116. In some other embodiments, the notification may be forwarded to an interface such as a Notifications Center on DPS2 116 and may be outputted via DPS2 116 using a banner or other interface superimposed on the home screen, etc.

The user of DPS2 116 may provide user input to a notification displayed to the user via an interface of DPS2 116. Accordingly, at 240, the DPS2 116 may receive user input for a displayed notification. For example, the notification outputted in 238 may include user-selectable options (e.g., buttons) corresponding to the options "Allow" and "Deny". The user of DPS2 116 may select one of these two options. Thus, the DPS2 116 may receive input indicating a selection of one of the options by the user.

At 242, the DPS2 116 communicates information to the AMS 102 indicative of the user input received in 240. For example, if the user has selected the "Allow" option, then information indicative of the selection may be communicated from DPS2 116 to the AMS 102 in 242. The communication from DPS2 116 to the AMS 102 in 242 may also include other information related to the notification. For example, the communication may include information indicative of whether the notification that was outputted to the user and to which the user provided input was a notification received by DPS2 116 via a third-party PNS (i.e., was a push notification) or was a notification received via a backchannel (i.e., was a pull notification). In certain embodiments, the communication from DPS2 116 to the AMS 102 in 242 may include a data packet having a set of flags (e.g., bit flags) to indicate whether the notification to which the user responded was delivered via a PNS or using a backchannel.

As previously described, DPS2 116 may receive multiple pull notifications for a user account in 234. Further, pull notifications may be received for multiple user accounts in 234. In certain embodiments, the processing illustrated in 236-242 and performed on DPS2 116 may be repeated for each received pull notification.

At 244, the AMS 102 receives the communication from the DPS2 116 indicative of the user input and updates the notification database 122 based upon the information received at 242. For example, the information stored for a notification in the notification database 122 (e.g., in the database entry created for the notification in 216) and associated with a user account may be updated to indicate that the notification has been "responded-to". The content of the response (e.g., "Allow" or "Deny") may also be stored for the notification in the database entry.

If the communication in 242 includes information indicative of whether the notification responded to by the user was a notification communicated to the DPS2 116 via a PNS (i.e., a push notification) or a corresponding notification communicated via a backchannel (i.e., a corresponding pull notification), then AMS 102 may also store that information for the notification in the database entry for that notification in the notification database 122.

At 246, the AMS 102 performs authentication for the user account's access to the resource based upon the user input received for the notification received in 242. For example, if the user input specifies selection of the "Deny" option, then authentication may be deemed to be unsuccessful or failed. Alternatively, if the user input specifies selection of the "Allow" option, then authentication may be deemed to be successful or passed. Accordingly, as part of 246, the AMS 102 performs authentication based upon the user input and generates a result of the authentication.

The authentication result generated in 244 is then communicated to DPS1 108, which is the source of the user request received in 204 for a user account accessing a resource. Various different techniques may be used for communicating this result to DPS1 108. In certain embodiments, at 248, after the request has been communicated in 204, DPS1 108 is configured to periodically poll the AMS 102 for a result of the authentication of that request. When the result of the authentication is available, the AMS 102 may respond to a subsequent poll request from DPS1 108 by communicating the authentication result to the DPS1 108 in 250 of FIG. 2F. Depending upon whether the authentication was a success or a failure, the poll response from the AMS 102 to DPS1 108 may also include other information. For example, if the authentication was a success, then the communication in 250 may include information (e.g., a redirect link) that enables the user via a browser executing on DPS1 108 to access the resource. If the authentication failed, then the communication in 250 may include a message indicating that authentication failed and access to the resource is denied. In some embodiments, a reason for the authentication failure may also be included in the information communicated form the AMS 102 to DPS1 108 in 250.

Assuming the authentication was a success, at 252, the user may use the information received in 250 to access the resource. For example, the redirect may be outputted to the user via the browser executing on DPS1 108. The user of DPS1 108 may then access the requested resource by selecting the displayed redirect link. For example, if the requested resource is a web page or document, then by clicking the redirect link, that web page or document may be outputted to the user of DPS1 108 by the browser.

At 254, the AMS 102 periodically performs garbage collection on the notification database 122. The periodicity of the garbage collection may be user-configurable, for example, by an administrator of the AMS 102. For example, the garbage collection may be performed every 24 hours, every 12 hours, every 3 hours, etc. As part of the garbage collection processing, the AMS 102 goes through the entries stored in the notification database 122 for the notifications and, for each entry, determines if the notification identified by the entry is expired and/or has been responded to. If the notification is expired or is marked as being responded-to, then that database entry is deleted from the notification database 122. Although 254 is illustrated as being performed after 252 in FIG. 2F, the two are not intended to be performed sequentially. Indeed, in certain embodiments, 252 is performed independently from other steps illustrated in FIGS. 2A-F and described above.

As indicated above, the particular sequence or order of steps depicted in FIGS. 2A-F is not intended to be limiting. In certain alternative embodiments, the steps may be performed in some different order or some steps may also be performed in parallel. For example, while steps 244-246 are shown as occurring in a particular order in flowchart 200 in FIGS. 2A-F, this is not intended to be limiting. In alternative embodiments, these can occur in any order. In yet other embodiments, the processing in steps 244-246 may overlap or may be performed in parallel.

Although FIGS. 2A-F illustrate processing in the context of performing authentication, a similar process may also be performed for authorization.

The infrastructure described above can be implemented in various different environments including a cloud environment (could be various types of clouds including private, public, and hybrid cloud environments), on-premises environment, a hybrid environment, and the like.

Figure 3:
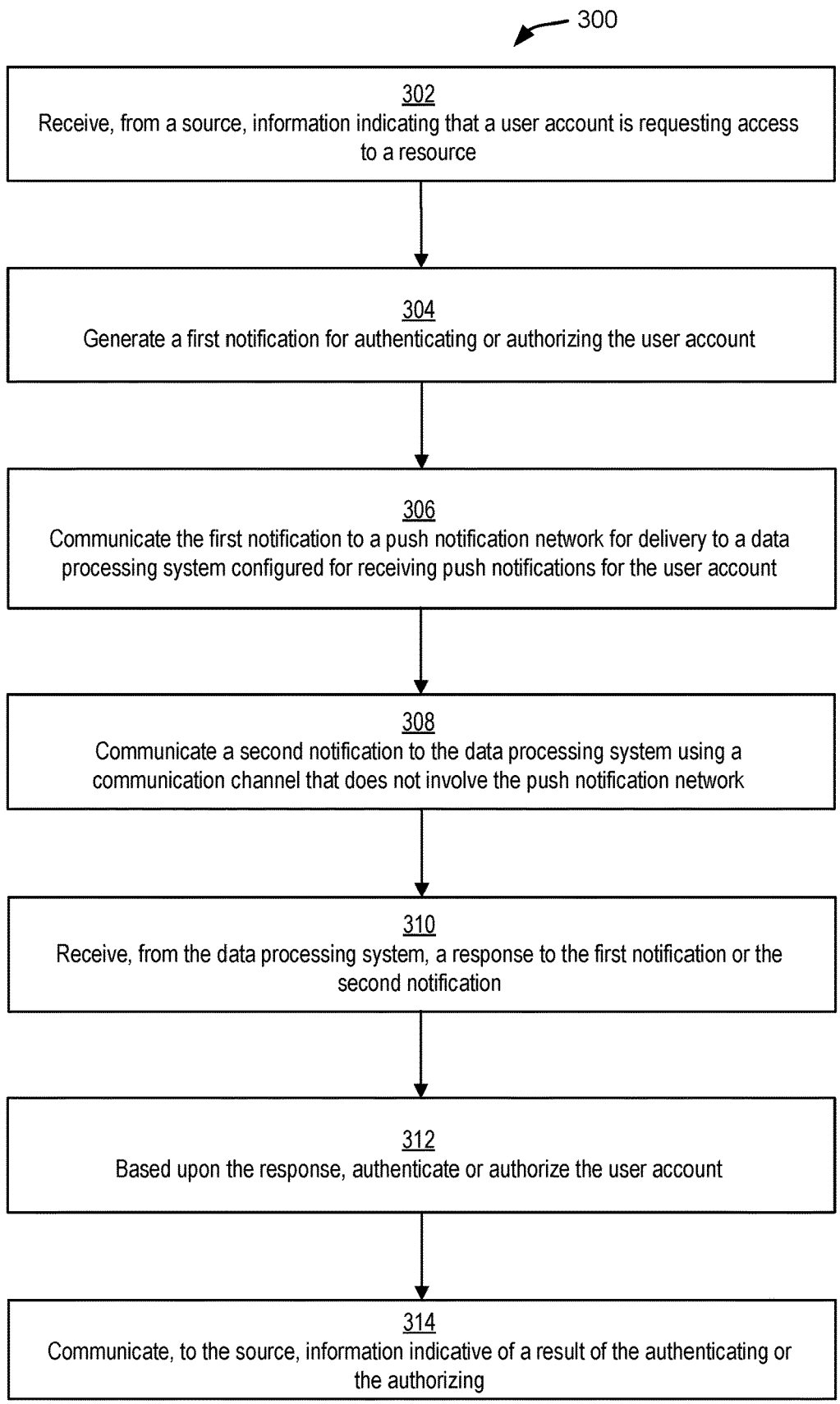
FIG. 3 is a simplified flowchart illustrating the processing performed in the distributed environment, in accordance with certain embodiments.

FIG. 3 is a simplified flowchart 300 illustrating processing performed for reliable notification-based authentication or authorization, in accordance with certain embodiments. In some embodiments, the processing is performed at an access management system. The method presented in FIG. 3 and described below is intended to be illustrative and non-limiting. Although FIG. 3 illustrates the various processing steps occurring in a particular sequence or order, this is not intended to be limiting. In certain alternative embodiments, the steps may be performed in some different order or some steps may also be performed in parallel. In certain embodiments, such as in the embodiment illustrated in FIG. 1, the processing illustrated in FIG. 3 may be performed by AMS 102.

At 302, the access management system receives information indicating that a user account is requesting access to a resource. The access management system receives the information from a source, which can be any data processing system. For example, in an authorization workflow context, the information may be a purchase request for an amount that exceeds an automatically approved limit (e.g., $10,000).

Thus, the requested resource may be monetary funds or a subsequent stage in a multi-stage purchase process.

At 304, the access management system generates a first notification for authenticating or authorizing the user account. The access management system generates the first notification responsive to receiving the information at 302. In some embodiments, the access management system also generates a copy of the first notification. For example, in the authorization workflow context, the first notification may include the message "A purchase of 5,000 widgets for the amount of $12,000 is requested."

At 306, the access management system communicates the first notification to a push notification network for delivery to a data processing system configured for receiving push notifications for the user account. As mentioned above, the source may be this data processing system or a different data processing system. For example, in the authorization workflow context, the source may be an employee's data processing system, and the push notifications may be communicated to a supervisor's data processing system.

At 308, the access management system communicates a second notification to the data processing system using a communication channel that does not involve the push notification network. The push notification is a duplicate of the first notification. The communication channel may be a verified backchannel established between the access management system and the data processing system.

At 310, the access management system receives from the data processing system, a response to the first notification or the second notification. The response is to whichever of the notifications is received first, if at all, by the access management system. The response comprises user input received at the data processing system. For example, the notifications may include the options "Approve" and "Deny". The user input may be received from the user requesting access or from a different user. For example, in the authorization workflow context, the user input may be received from a supervisor of the employee requesting the resource. In some embodiments, the supervisor may receive notifications originating from multiple employees at approximately the same time, even when the supervisor's data processing system has previously been offline.

At 312, the access management system may authenticate or authorize the user account based upon the response. More specifically, the access management system may authenticate or authorize the user account if authentication or authorization is successful, and the access management system may not authenticate or authorize the user account if authentication or authorization is unsuccessful. For example, in the authorization workflow context, the supervisor may select the "Approve" option, thereby providing the access management system with information indicative of a successful authorization.

At 314, the access management system communicates information indicative of a result of the authenticating or authorizing to the source. The result may be an address of the resource when authentication or authorization is successful. For example, in the authorization workflow context, the result may be a uniform resource locator for a web page where further details of the requested purchase may be provided upon the supervisor's approval.

Significantly, communicating notifications via multiple channels increases the reliability of notification-based authentication and/or authorization. Thus, even when a PNS is unavailable in a particular geographical region (e.g., China) or when a proxy server interferes with access to a PNS, authentication and/or authorization may proceed based upon a duplicate notification delivered via an alternate channel.

Furthermore, the alternate channel may be established with a system that can store/is coupled to a system that can store more than notification per application per device. Accordingly, notifications targeting an offline device are not inadvertently discarded.

Figure 4:
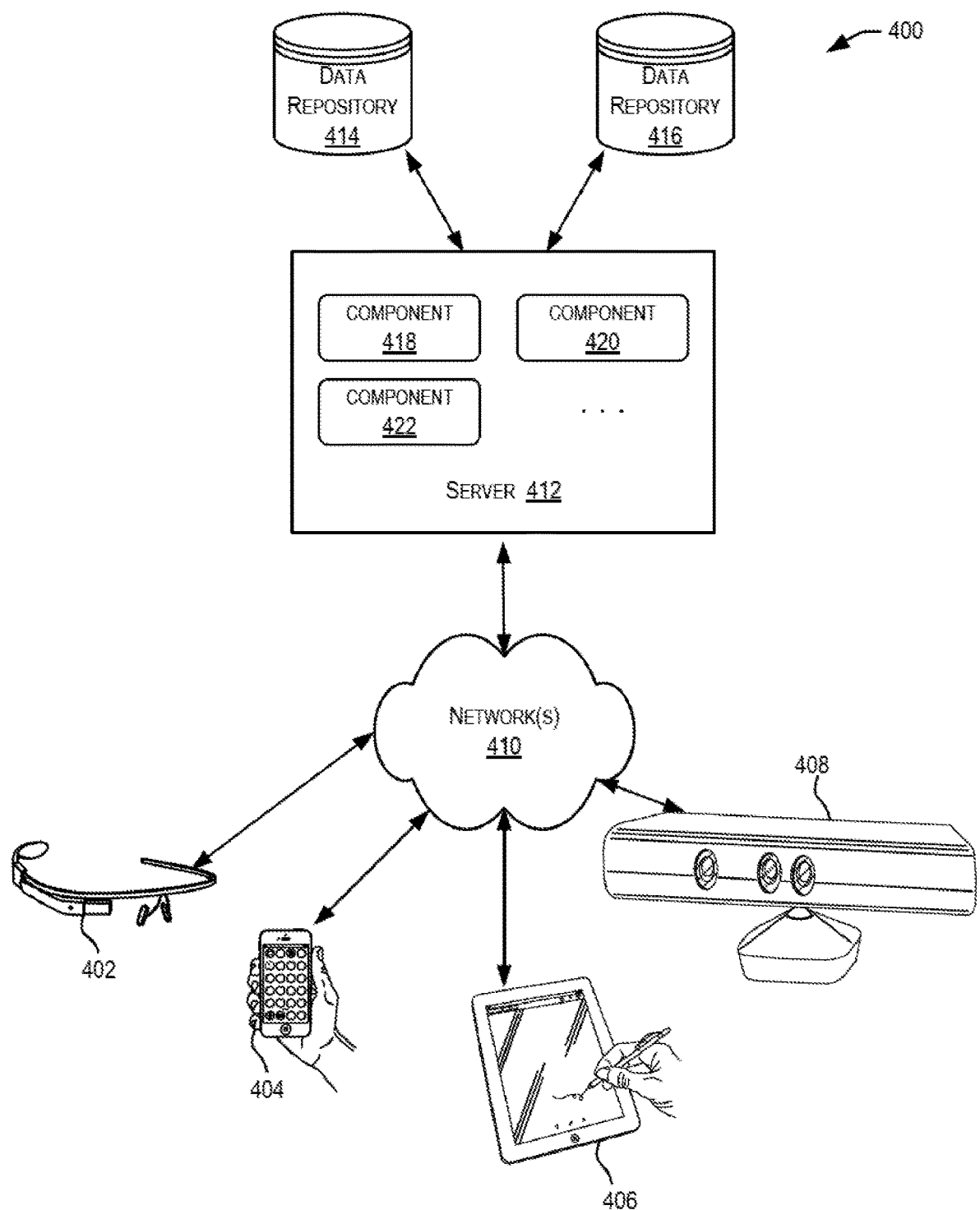
FIG. 4 is a simplified diagram of a distributed system for implementing an embodiment.

FIG. 4 depicts a simplified diagram of a distributed system 400 for implementing an embodiment. In the illustrated embodiment, distributed system 400 includes one or more client computing devices 402, 404, 406, and 408, coupled to a server 412 via one or more communication networks 410. Clients computing devices 402, 404, 406, and 408 may be configured to execute one or more applications.

In various embodiments, server 412 may be adapted to run one or more services or software applications that enable the management of access to a resource. For example, server 412 may generate and send a push notification for determining whether or not to allow a client device to access a resource.

In certain embodiments, server 412 may also provide other services or software applications that can include non-virtual and virtual environments. In some embodiments, these services may be offered as web-based or cloud services, such as under a Software as a Service (SaaS) model to the users of client computing devices 402, 404, 406, and/or 408. Users operating client computing devices 402, 404, 406, and/or 408 may in turn utilize one or more client applications to interact with server 412 to utilize the services provided by these components.

In the configuration depicted in FIG. 4, server 412 may include one or more components 418, 420 and 422 that implement the functions performed by server 412. These components may include software components that may be executed by one or more processors, hardware components, or combinations thereof. It should be appreciated that various different system configurations are possible, which may be different from distributed system 400. The embodiment shown in FIG. 4 is thus one example of a distributed system for implementing an embodiment system and is not intended to be limiting.

Users may use client computing devices 402, 404, 406, and/or 408 to execute one or more applications, which may generate one or more requests that may be serviced in accordance with the teachings of this disclosure. A client device may provide an interface that enables a user of the client device to interact with the client device. The client device may also output information to the user via this interface. Although FIG. 4 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 410 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 410 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 412 can include one or more virtual machines running virtual operating systems, or other computing architectures involving virtualization such as one or more flexible pools of logical storage devices that can be virtualized to maintain virtual storage devices for the server. In various embodiments, server 412 may be adapted to run one or more services or software applications that provide the functionality described in the foregoing disclosure.

The computing systems in server 412 may run one or more operating systems including any of those discussed above, as well as any commercially available server operating system. Server 412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 412 may include one or more applications to analyze and consolidate data feeds and/or event updates received from users of client computing devices 402, 404, 406, and 408. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 412 may also include one or more applications to display the data feeds and/or real-time events via one or more display devices of client computing devices 402, 404, 406, and 408.

Distributed system 400 may also include one or more data repositories 414, 416. These data repositories may be used to store data and other information in certain embodiments. For example, one or more of the data repositories 414, 416 may be used to store information associated with the disclosure herein. Data repositories 414, 416 may reside in a variety of locations. For example, a data repository used by server 412 may be local to server 412 or may be remote from server 412 and in communication with server 412 via a network-based or dedicated connection. Data repositories 414, 416 may be of different types. In certain embodiments, a data repository used by server 412 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 414, 416 may also be used by applications to store application data. The data repositories used by applications may be of different types such as, for example, a key-value store repository, an object store repository, or a general storage repository supported by a file system.

Figure 5:
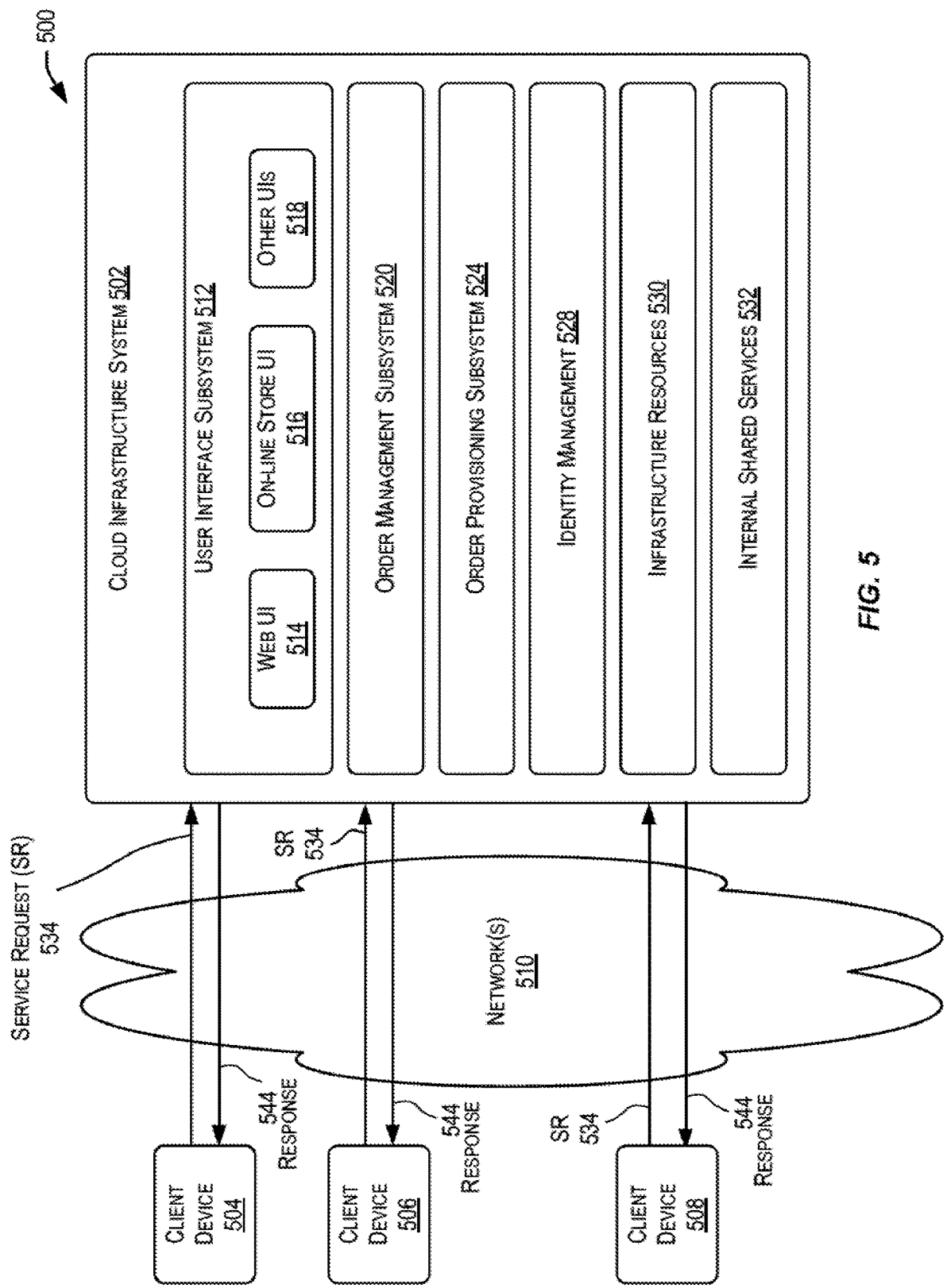
FIG. 5 is a simplified block diagram of a cloud-based system environment in which various authentication-related services may be offered as cloud services, in accordance with certain embodiments.

In certain embodiments, the functionalities described in this disclosure may be offered as services via a cloud environment. FIG. 5 is a simplified block diagram of a cloud-based system environment in which various services may be offered as cloud services, in accordance with certain embodiments. In the embodiment depicted in FIG. 5, cloud infrastructure system 502 may provide one or more cloud services that may be requested by users using one or more client computing devices 504, 506, and 508. Cloud infrastructure system 502 may comprise one or more computers and/or servers that may include those described above for server 412. The computers in cloud infrastructure system 502 may be organized as general purpose computers, specialized server computers, server farms, server clusters, or any other appropriate arrangement and/or combination.

Network(s) 510 may facilitate communication and exchange of data between clients 504, 506, and 508 and cloud infrastructure system 502. Network(s) 510 may include one or more networks. The networks may be of the same or different types. Network(s) 510 may support one or more communication protocols, including wired and/or wireless protocols, for facilitating the communications.

The embodiment depicted in FIG. 5 is only one example of a cloud infrastructure system and is not intended to be limiting. It should be appreciated that, in some other embodiments, cloud infrastructure system 502 may have more or fewer components than those depicted in FIG. 5, may combine two or more components, or may have a different configuration or arrangement of components. For example, although FIG. 5 depicts three client computing devices, any number of client computing devices may be supported in alternative embodiments.

The term cloud service is generally used to refer to a service that is made available to users on demand and via a communication network such as the Internet by systems (e.g., cloud infrastructure system 502) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 502 may provide one or more cloud services using different models such as under a Software as a Service (SaaS) model, a Platform as a Service (PaaS) model, an Infrastructure as a Service (IaaS) model, and others, including hybrid service models. Cloud infrastructure system 502 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 502. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 502. Cloud infrastructure system 502 then performs processing to provide the services requested in the customer's subscription order. For example, a user may request the cloud infrastructure system to register an application, as described above, and provide management services to the application per the application's specified management-related requirements. Cloud infrastructure system 502 may be configured to provide one or even multiple cloud services.

Cloud infrastructure system 502 may provide the cloud services via different deployment models. In a public cloud model, cloud infrastructure system 502 may be owned by a third party cloud services provider and the cloud services are offered to any general public customer, where the customer can be an individual or an enterprise. In certain other embodiments, under a private cloud model, cloud infrastructure system 502 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 502 and the services provided may be shared by several organizations in a related community. Various other models such as hybrids of the above mentioned models may also be used.

Client computing devices 504, 506, and 508 may be of different types (such as devices 402, 404, 406, and 408 depicted in FIG. 4) and may be capable of operating one or more client applications. A user may use a client device to interact with cloud infrastructure system 502, such as to request a service provided by cloud infrastructure system 502. For example, a user may use a client device to request a management-related service described in this disclosure.

In some embodiments, the processing performed by cloud infrastructure system 502 for providing management-related services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 502 for determining an application's management-related requirements. The data used for this analysis may include structured data (e.g., data stored in a database or structured according to a structured model) and/or unstructured data (e.g., data blobs (binary large objects)).

As depicted in the embodiment in FIG. 5, cloud infrastructure system 502 may include infrastructure resources 530 that are utilized for facilitating the provision of various cloud services offered by cloud infrastructure system 502. Infrastructure resources 530 may include, for example, processing resources, storage or memory resources, networking resources, and the like.

In certain embodiments, to facilitate efficient provisioning of these resources for supporting the various cloud services provided by cloud infrastructure system 502 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 502 may itself internally use services 532 that are shared by different components of cloud infrastructure system 502 and which facilitate the provisioning of services by cloud infrastructure system 502. These internal shared services may include, without limitation, a security and identity service, an integration service, an enterprise repository service, an enterprise manager service, a virus scanning and white list service, a high avail-ability, backup and recovery service, service for enabling cloud support, an email service, a notification service, a file transfer service, and the like.

Cloud infrastructure system 502 may comprise multiple subsystems. These subsystems may be implemented in software, or hardware, or combinations thereof. As depicted in FIG. 5, the subsystems may include a user interface subsystem 512 that enables users or customers of cloud infrastructure system 502 to interact with cloud infrastructure system 502. User interface subsystem 512 may include various different interfaces such as a web interface 514, an online store interface 516 where cloud services provided by cloud infrastructure system 502 are advertised and are purchasable by a consumer, and other interfaces 518. For example, a customer may, using a client device, request (service request 534) one or more services provided by cloud infrastructure system 502 using one or more of interfaces 514, 516, and 518. For example, a customer may access the online store, browse cloud services offered by cloud infrastructure system 502, and place a subscription order for one or more services offered by cloud infrastructure system 502 that the customer wishes to subscribe to. The service request may include information identifying the customer and one or more services that the customer desires to subscribe to. For example, a customer may place a subscription order for a management-related service offered by cloud infrastructure system 502. As part of the order, the customer may provide information identifying an application for which the service is to be provided and the one or more credentials for the application.

In certain embodiments, such as the embodiment depicted in FIG. 5, cloud infrastructure system 502 may comprise an order management subsystem (OMS) 520 that is configured to process the new order. As part of this processing, OMS 520 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 520 may then invoke the order provisioning subsystem (OPS) 524 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 524 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 502 may send a response or notification 544 to the requesting customer to indicate when the requested service is now ready for use. In some instances, information (e.g., a link) may be sent to the customer that enables the customer to start using and availing the benefits of the requested services. In certain embodiments, for a customer requesting the management-related service, the response may include an application ID generated by cloud infrastructure system 502 for an application.

Cloud infrastructure system 502 may provide services to multiple customers. For each customer, cloud infrastructure system 502 is responsible for managing information related to one or more subscription orders received from the customer, maintaining customer data related to the orders, and providing the requested services to the customer. Cloud infrastructure system 502 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 502 may provide services to multiple customers in parallel. Cloud infrastructure system 502 may store information for these customers, including possibly proprietary information. In certain embodiments, cloud infrastructure system 502 comprises an identity management subsystem (IMS) 528 that is configured to manage customers information and provide the separation of the managed information such that information related to one customer is not accessible by another customer. IMS 528 may be configured to provide various security-related services such as identity services, such as information access management, authentication and authorization services, services for managing customer identities and roles and related capabilities, and the like.

Figure 6:
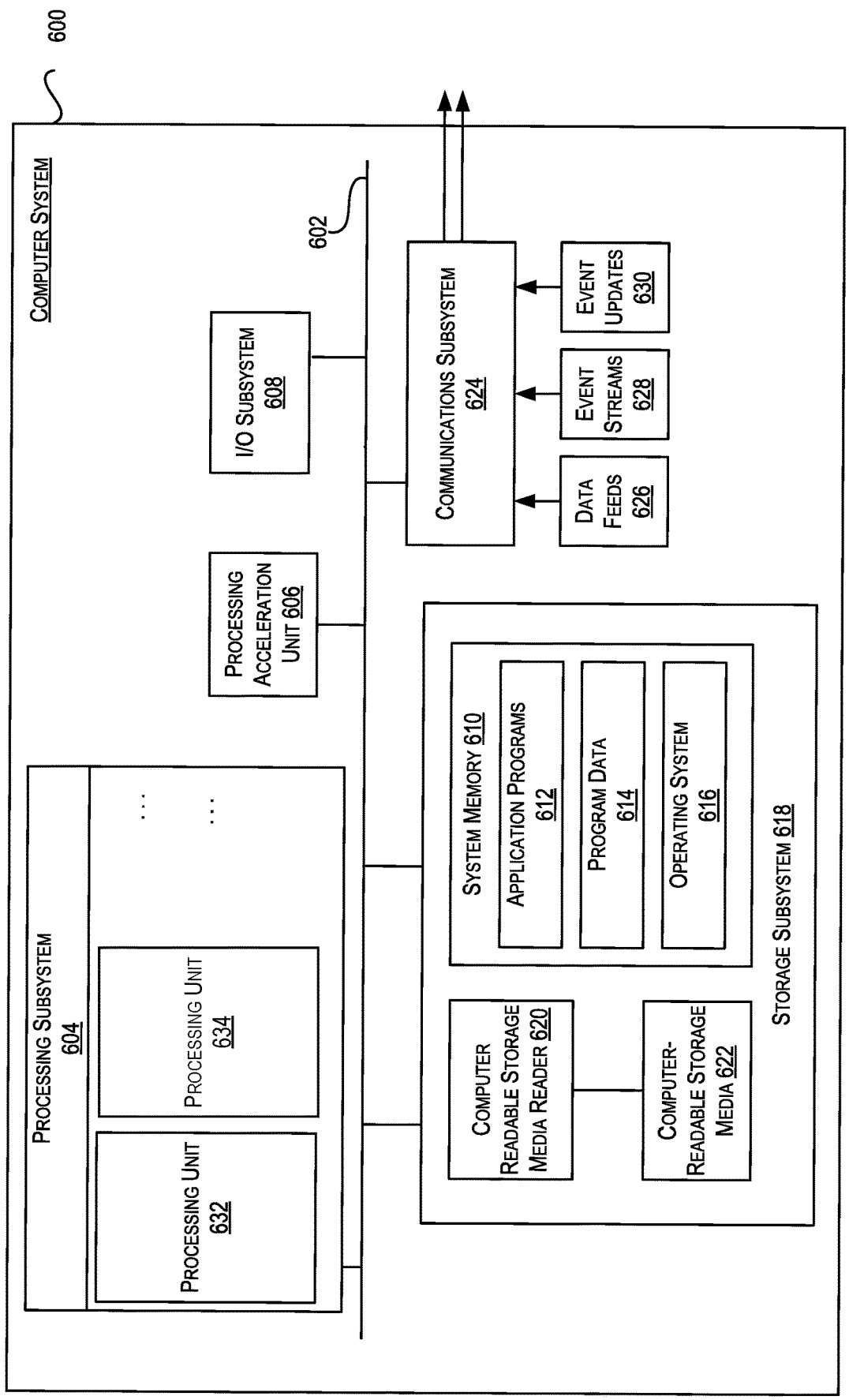
FIG. 6 illustrates an example of a computer system that may be used to implement certain embodiments.

FIG. 6 illustrates an exemplary computer system 600 that may be used to implement certain embodiments. For example, in some embodiments, computer system 600 may be used to implement any of the application systems, management system, systems within a data store, and various servers and computer systems described above. As shown in FIG. 6, computer system 600 includes various subsystems including a processing subsystem 604 that communicates with a number of other subsystems via a bus subsystem 602. These other subsystems may include a processing acceleration unit 606, an I/O subsystem 608, a storage subsystem 618, and a communications subsystem 624. Storage subsystem 618 may include non-transitory computer-readable storage media including storage media 622 and a system memory 610.

Bus subsystem 602 provides a mechanism for letting the various components and subsystems of computer system 600 communicate with each other as intended. Although bus subsystem 602 is shown schematically as a single bus, alternative embodiments of the bus subsystem may utilize multiple buses. Bus subsystem 602 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 604 controls the operation of computer system 600 and may comprise one or more processors, application specific integrated circuits (ASICs), or field programmable gate arrays (FPGAs). The processors may include be single core or multicore processors. The processing resources of computer system 600 can be organized into one or more processing units 632, 634, etc. A processing unit may include one or more processors, one or more cores from the same or different processors, a combination of cores and processors, or other combinations of cores and processors. In some embodiments, processing subsystem 604 can include one or more special purpose co-processors such as graphics processors, digital signal processors (DSPs), or the like. In some embodiments, some or all of the processing units of processing subsystem 604 can be implemented using customized circuits, such as application specific integrated circuits (ASICs), or field programmable gate arrays (FPGAs).

In some embodiments, the processing units in processing subsystem 604 can execute instructions stored in system memory 610 or on computer readable storage media 622. In various embodiments, the processing units can execute a variety of programs or code instructions and can maintain multiple concurrently executing programs or processes. At any given time, some or all of the program code to be executed can be resident in system memory 610 and/or on computer-readable storage media 622 including potentially on one or more storage devices. Through suitable programming, processing subsystem 604 can provide various functionalities described above. In instances where computer system 600 is executing one or more virtual machines, one or more processing units may be allocated to each virtual machine.

In certain embodiments, a processing acceleration unit 606 may optionally be provided for performing customized processing or for off-loading some of the processing performed by processing subsystem 604 so as to accelerate the overall processing performed by computer system 600.

I/O subsystem 608 may include devices and mechanisms for inputting information to computer system 600 and/or for outputting information from or via computer system 600. In general, use of the term input device is intended to include all possible types of devices and mechanisms for inputting information to computer system 600. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google) Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 600 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 618 provides a repository or data store for storing information and data that is used by computer system 600. Storage subsystem 618 provides a tangible non-transitory computer-readable storage medium for storing the basic programming and data constructs that provide the functionality of some embodiments. Storage subsystem 618 may store software (e.g., programs, code modules, instructions) that when executed by processing subsystem 604 provides the functionality described above. The software may be executed by one or more processing units of processing subsystem 604. Storage subsystem 618 may also provide a repository for storing data used in accordance with the teachings of this disclosure.

Storage subsystem 618 may include one or more non-transitory memory devices, including volatile and non-volatile memory devices. As shown in FIG. 6, storage subsystem 618 includes a system memory 610 and a computer-readable storage media 622. System memory 610 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 600, such as during start-up, may typically be stored in the ROM. The RAM typically contains data and/or program modules that are presently being operated and executed by processing subsystem 604. In some implementations, system memory 610 may include multiple different types of memory, such as static random access memory (SRAM), dynamic random access memory (DRAM), and the like.

By way of example, and not limitation, as depicted in FIG. 6, system memory 610 may load application programs 612 that are being executed, which may include various applications such as Web browsers, mid-tier applications, relational database management systems (RDBMS), etc., program data 614, and an operating system 616. By way of example, operating system 616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 622 may store programming and data constructs that provide the functionality of some embodiments. Computer-readable media 622 may provide storage of computer-readable instructions, data structures, program modules, and other data for computer system 600. Software (programs, code modules, instructions) that, when executed by processing subsystem 604 provides the functionality described above, may be stored in storage subsystem 618. By way of example, computer-readable storage media 622 may include non-volatile memory such as a hard disk drive, a magnetic disk drive, an optical disk drive such as a CD ROM, DVD, a Blu-Ray® disk, or other optical media. Computer-readable storage media 622 may include, but is not limited to, Zip® drives, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 618 may also include a computer-readable storage media reader 620 that can further be connected to computer-readable storage media 622. Reader 620 may receive and be configured to read data from a memory device such as a disk, a flash drive, etc.

In certain embodiments, computer system 600 may support virtualization technologies, including but not limited to virtualization of processing and memory resources. For example, computer system 600 may provide support for executing one or more virtual machines. In certain embodiments, computer system 600 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 600. Accordingly, multiple operating systems may potentially be run concurrently by computer system 600.

Communications subsystem 624 provides an interface to other computer systems and networks. Communications subsystem 624 serves as an interface for receiving data from and transmitting data to other systems from computer system 600. For example, communications subsystem 624 may enable computer system 600 to establish a communication channel to one or more client devices via the Internet for receiving and sending information from and to the client devices.

Communication subsystem 624 may support both wired and/or wireless communication protocols. For example, in certain embodiments, communications subsystem 624 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 624 can provide wired network connectivity (e.g., Ethernet) in addition to or instead of a wireless interface.

Communication subsystem 624 can receive and transmit data in various forms. For example, in some embodiments, in addition to other forms, communications subsystem 624 may receive input communications in the form of structured and/or unstructured data feeds 626, event streams 628, event updates 630, and the like. For example, communications subsystem 624 may be configured to receive (or send) data feeds 626 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 624 may be configured to receive data in the form of continuous data streams, which may include event streams 628 of real-time events and/or event updates 630, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 624 may also be configured to communicate data from computer system 600 to other computer systems or networks. The data may be communicated in various different forms such as structured and/or unstructured data feeds 626, event streams 628, event updates 630, and the like to one or more databases that may be in communication with one or more streaming data source computers coupled to computer system 600.

Computer system 600 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 600 depicted in FIG. 6 is intended only as a specific example. Many other configurations having more or fewer components than the system depicted in FIG. 6 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

What is claimed is:

1. A method comprising:
   receiving, at an access management system from a source, information indicating that a user account is requesting access to a resource;
   responsive to receiving the information, generating, at the access management system, a first notification for authenticating or authorizing the user account in response to the user account requesting access to the resource;
   storing first information for the first notification;
   communicating, from the access management system, the first notification to a push notification network for delivery to a first data processing system, wherein the first data processing system is configured for receiving push notifications for authenticating or authorizing the user account;
   receiving, at the access management system, a request from the first data processing system for one or more notifications for the user account;
   responsive to the request from the first data processing system, communicating, from the access management system to the first data processing system using a communication channel that does not involve the push notification network, a second notification corresponding to the first notification for authenticating or authorizing the user account in response to the user account requesting access to the resource;
   receiving, at the access management system from the first data processing system, a response to the first notification or the second notification, wherein the response comprises user input received at the first data processing system;
   authenticating or authorizing, by the access management system, the user account based upon the response to the first notification or the second notification, wherein the response indicates whether the response was in response to the first notification or the second notification;

updating the first information to indicate whether the response was in response to the first notification or the second notification; and communicating, from the access management system to the source, information indicative of a result of the authenticating or the authorizing.

2. The method of claim 1 wherein the source is a second data processing system that is separate from the first data processing system.

3. The method of claim 1 wherein the source is the first data processing system.

4. The method of claim 1 wherein the first notification and the second notification share a common identifier.

5. The method of claim 1, wherein the first information includes one or more identifiers associated with the first notification, the method further comprising responsive to receiving the request from the first data processing system, generating, at the access management system, the second notification using the one or more identifiers.

6. The method of claim 1 further comprising:

generating, at the access management system, the second notification based upon making a copy of the first notification.

7. The method of claim 1 wherein the response is to the first notification.

8. The method of claim 1 wherein the response is to the second notification when the first data processing system receives the second notification before the first notification.

9. The method of claim 1 wherein the response is to the second notification when the first data processing system does not receive the first notification.

10. The method of claim 1 wherein the information indicative of the result of the authenticating or the authorizing comprises information indicating that the authenticating or the authorizing was successful, and the result includes an address of the resource.

11. The method of claim 1 wherein the information indicative of the result of the authenticating or the authorizing comprises information indicating that the authenticating or the authorizing was not successful.

12. The method of claim 1 wherein the communication channel is established between the access management system and an application on the first data processing system, and wherein the first notification or the second notification is displayed at the first data processing system when the application is in an unlaunched state.

13. A non-transitory computer-readable memory storing a plurality of instructions executable by one or more processors, the plurality of instructions comprising instructions that when executed by the one or more processors cause the one or more processors to perform processing comprising:

receiving, at an access management system from a source, information indicating that a user account is requesting access to a resource;

responsive to receiving the information, generating, at the access management system, a first notification for authenticating or authorizing the user account in response to the user account requesting access to the resource;

storing first information for the first notification;

communicating, from the access management system, the first notification to a push notification network for delivery to a first data processing system, wherein the first data processing system is configured for receiving push notifications for authenticating or authorizing the user account;

receiving, at the access management system, a request from the first data processing system for one or more notifications for the user account;

responsive to the request from the first data processing system, communicating, from the access management system to the first data processing system using a communication channel that does not involve the push notification network, a second notification corresponding to the first notification for authenticating or authorizing the user account in response to the user account requesting access to the resource;

receiving, at the access management system from the first data processing system, a response to the first notification or the second notification, wherein the response comprises user input received at the first data processing system;

authenticating or authorizing, by the access management system, the user account based upon the response to the first notification or the second notification, wherein the response indicates whether the response was in response to the first notification or the second notification;

updating the first information to indicate whether the response was in response to the first notification or the second notification; and communicating, from the access management system to the source, information indicative of a result of the authenticating or the authorizing.

14. The non-transitory computer-readable memory of claim 13 wherein the source is a second data processing system that is separate from the first data processing system.

15. The non-transitory computer-readable memory of claim 13 wherein the response is to the second notification when the first data processing system does not receive the first notification.

16. A system comprising:

one or more processors;

a memory coupled to the one or more processors, the memory storing a plurality of instructions executable by the one or more processors, the plurality of instructions comprising instructions that when executed by the one or more processors cause the one or more processors to perform processing comprising:

receiving, at an access management system from a source, information indicating that a user account is requesting access to a resource;

responsive to receiving the information, generating, at the access management system, a first notification for authenticating or authorizing the user account in response to the user account requesting access to the resource;

storing first information for the first notification;

communicating, from the access management system, the first notification to a push notification network for delivery to a first data processing system, wherein the first data processing system is configured for receiving push notifications for authenticating or authorizing the user account;

receiving, at the access management system, a request from the first data processing system for one or more notifications for the user account;

responsive to the request from the first data processing system, communicating, from the access management system to the first data processing system using a communication channel that does not involve the push notification network, a second notification corresponding to the first notification for authenticating or authorizing the user account in response to the user account requesting access to the resource;

receiving, at the access management system from the first data processing system, a response to the first notification or the second notification, wherein the response comprises user input received at the first data processing system;

authenticating or authorizing, by the access management system, the user account based upon the response to the first notification or the second notification, wherein the response indicates whether the response was in response to the first notification or the second notification;

updating the first information to indicate whether the response was in response to the first notification or the second notification; and communicating, from the access management system to the source, information indicative of a result of the authenticating or the authorizing.

17. The system of claim 16 wherein the source is a second data processing system that is separate from the first data processing system.

18. The system of claim 16 wherein the response is to the second notification when the first data processing system does not receive the first notification.

* * * * *

UNITED STATES PATENT AND TRADEMARK OFFICE
CERTIFICATE OF CORRECTION

PATENT NO. : 10,841,389 B2  
APPLICATION NO. : 16/051124  
DATED : November 17, 2020  
INVENTOR(S) : Kumar et al.

Page 1 of 1

It is certified that error appears in the above-identified patent and that said Letters Patent is hereby corrected as shown below:

In the Drawings

On sheet 2 of 11, in FIG. 2A, Line 1, delete "MANGEMENT" and insert -- MANAGEMENT --, therefor.

On sheet 3 of 11, in FIG. 2B, Line 1, delete "MANGEMENT" and insert -- MANAGEMENT --, therefor.

On sheet 4 of 11, in FIG. 2C, Line 1, delete "MANGEMENT" and insert -- MANAGEMENT --, therefor.

On sheet 5 of 11, in FIG. 2D, Line 1, delete "MANGEMENT" and insert -- MANAGEMENT --, therefor.

On sheet 6 of 11, in FIG. 2E, Line 1, delete "MANGEMENT" and insert -- MANAGEMENT --, therefor.

Figure 2F:
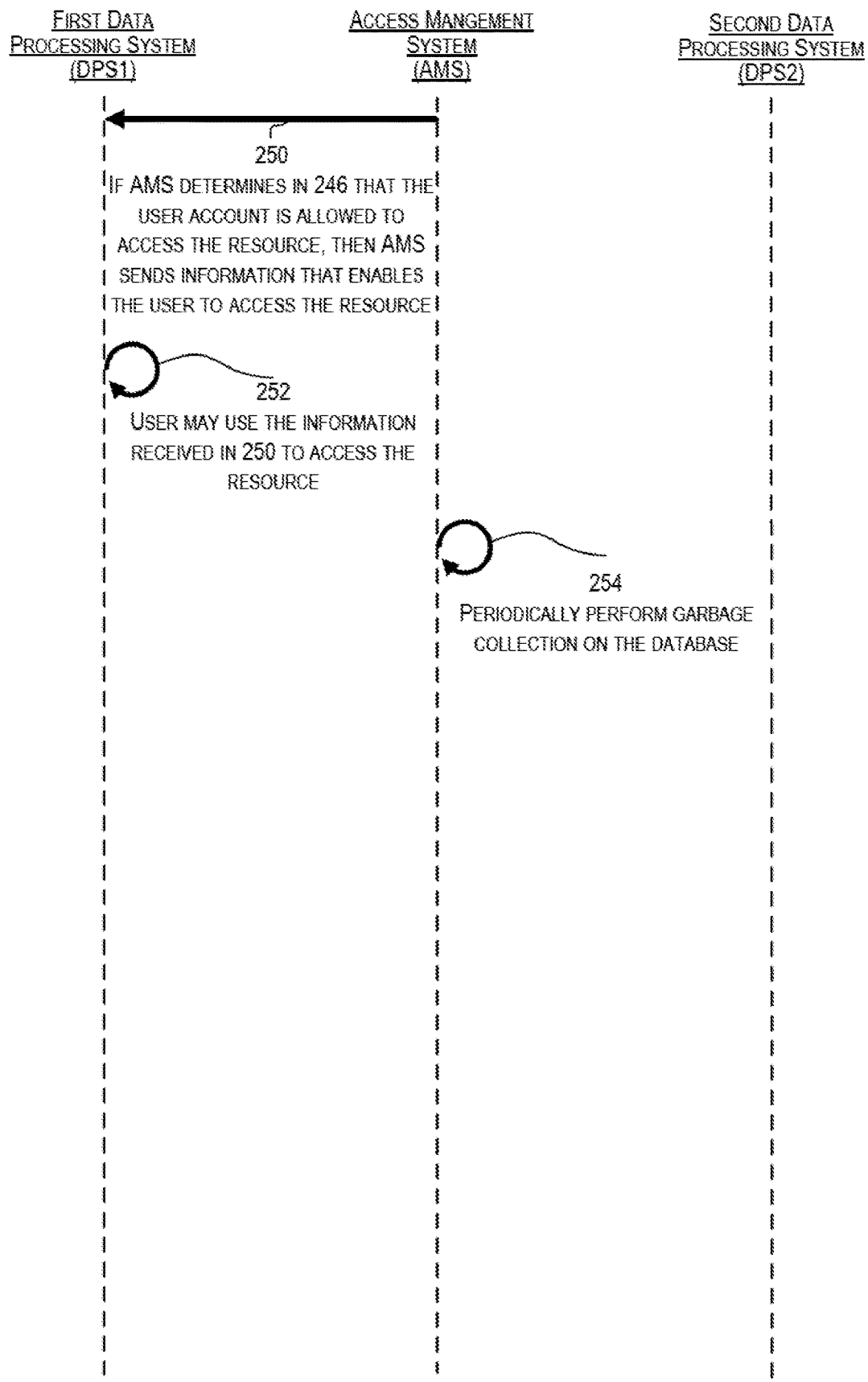

On sheet 7 of 11, in FIG. 2F, Line 1, delete "MANGEMENT" and insert -- MANAGEMENT --, therefor.

In the Specification

In Column 23, Line 24, delete "infra-red" and insert -- infrared --, therefor.

Signed and Sealed this  
Twentieth Day of July, 2021

Drew Hirshfeld  
*Performing the Functions and Duties of the*  
*Under Secretary of Commerce for Intellectual Property and*  
*Director of the United States Patent and Trademark Office*